United States Patent
Ueda et al.

(10) Patent No.: US 10,494,704 B2
(45) Date of Patent: Dec. 3, 2019

(54) RAIL

(71) Applicant: NIPPON STEEL & SUMITOMO METAL CORPORATION, Tokyo (JP)

(72) Inventors: Masaharu Ueda, Kitakyushu (JP); Takuya Tanahashi, Kitakyushu (JP); Teruhisa Miyazaki, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 160 days.

(21) Appl. No.: 15/543,805

(22) PCT Filed: Jan. 22, 2016

(86) PCT No.: PCT/JP2016/051878
§ 371 (c)(1),
(2) Date: Jul. 14, 2017

(87) PCT Pub. No.: WO2016/117689
PCT Pub. Date: Jul. 28, 2016

(65) Prior Publication Data
US 2017/0369975 A1  Dec. 28, 2017

(30) Foreign Application Priority Data
Jan. 23, 2015  (JP) .................... 2015-011006

(51) Int. Cl.
*C22C 38/24* (2006.01)
*C21D 9/04* (2006.01)
(Continued)

(52) U.S. Cl.
CPC ............... *C22C 38/24* (2013.01); *C21D 9/04* (2013.01); *C21D 9/46* (2013.01); *C22C 38/00* (2013.01);
(Continued)

(58) Field of Classification Search
CPC ..... E01B 5/00; E01B 5/02; E01B 5/08; E01B 5/10; C22C 38/02; C22C 38/04; C22C 38/06; C22C 38/18; C22C 38/28
See application file for complete search history.

(56) References Cited

U.S. PATENT DOCUMENTS

| | | |
|---|---|---|
| 2010/0186857 A1 | 7/2010 | Honjo et al. |
| 2011/0253268 A1 | 10/2011 | Zou et al. |

(Continued)

FOREIGN PATENT DOCUMENTS

| | | |
|---|---|---|
| JP | 63-23244 B2 | 5/1988 |
| JP | 8-109438 A | 4/1996 |

(Continued)

OTHER PUBLICATIONS

International Search Report, issued in PCT/JP2016/051878, dated Apr. 12, 2016.
(Continued)

*Primary Examiner* — Robert J McCarry, Jr.
(74) *Attorney, Agent, or Firm* — Birch, Stewart, Kolasch & Birch, LLP

(57) ABSTRACT

The present invention relates to a rail which has a predetermined chemical composition and satisfies expressions of $1.00<Mn/Cr\leq4.00$ and $0.30\leq0.25\times Mn+Cr\leq1.00$ and in which a structure to a depth of 25 mm from an outer surface of a head portion as the origin includes 95% or greater of a pearlite structure, the hardness of the structure is in a range of Hv 350 to 480, 50 to 500 V carbonitride having an average grain size of 5 to 20 nm are present per 1.0 μm² of an area to be inspected in a transverse cross section at a position having a depth of 25 mm from the outer surface of the head portion, and the value obtained by subtracting the hardness of the position having the depth of 25 mm from the outer surface of the head portion from the hardness of the (Continued)

position having a depth of 2 mm from the outer surface of the head portion is in a range of Hv 0 to Hv 40.

2 Claims, 7 Drawing Sheets

(51) Int. Cl.
*C22C 38/00* (2006.01)
*C22C 38/54* (2006.01)
*C22C 38/02* (2006.01)
*C22C 38/04* (2006.01)
*C21D 9/46* (2006.01)
*C22C 38/06* (2006.01)
*C22C 38/18* (2006.01)
*C21D 8/00* (2006.01)

(52) U.S. Cl.
CPC ............ *C22C 38/001* (2013.01); *C22C 38/02* (2013.01); *C22C 38/04* (2013.01); *C22C 38/06* (2013.01); *C22C 38/18* (2013.01); *C22C 38/54* (2013.01); *C21D 8/00* (2013.01); *C21D 2211/009* (2013.01); *Y02P 10/212* (2015.11)

(56) References Cited

U.S. PATENT DOCUMENTS

| 2013/0065079 | A1 | 3/2013 | Ueda et al. |
| 2014/0130943 | A1 | 5/2014 | Bramfitt et al. |
| 2015/0136864 | A1 | 5/2015 | Ueda et al. |
| 2016/0083820 | A1 | 3/2016 | Kimura et al. |

FOREIGN PATENT DOCUMENTS

| JP | 8-144016 A | | 6/1996 | |
| JP | 10-195601 | * | 7/1998 | ............ C22C 38/00 |
| JP | 10-195601 A | | 7/1998 | |
| JP | 2000-8142 A | | 1/2000 | |
| JP | 2000-226637 A | | 8/2000 | |
| JP | 2003-129180 A | | 5/2003 | |
| JP | 3445619 B2 | | 9/2003 | |
| JP | 351342 B2 | | 3/2004 | |
| JP | 2009-108396 A | | 5/2009 | |
| JP | 2014-101583 A | | 6/2014 | |
| RU | 2 107 740 C1 | | 3/1998 | |
| RU | 2 459 009 C2 | | 8/2012 | |
| RU | 2 461 639 C1 | | 9/2012 | |
| RU | 2 476 617 C1 | | 2/2013 | |
| RU | 2 485 201 C2 | | 6/2013 | |
| WO | WO 2014/157252 A1 | | 10/2014 | |

OTHER PUBLICATIONS

Written Opinion of the International Searching Authority (PCT/ISA/237), issued in PCT/JP2016/051878, dated Apr. 12, 2016.
Extended European Search Report for counterpart European Application No. 16740296.5, dated May 9, 2018.
JISF, "JIS Z 2244: 2009 Vickers Hardness Test," Jan. 20, 2009, pp. 1-2, 394-497 (102 pages total) with English translation.
Russian Notice of Allowance dated Jul. 12, 2018, issued in Russian Patent Application No. 2017128816.

* cited by examiner

RAIL

TECHNICAL FIELD OF THE INVENTION

The present invention relates to a high-strength rail that is used in cargo railways and has excellent wear resistance and internal fatigue damage resistance.

Priority is claimed on Japanese Patent Application No. 2015-011006, filed on Jan. 23, 2015, the content of which is incorporated herein by reference.

RELATED ART

With economic development, natural resources such as coal have been newly developed. Specifically, mining in regions with severe natural environments which have not yet been developed have been promoted. Along with this, the railroad environment of cargo railways used to transport resources has become increasingly severe. As the result, rails have been required to have more wear resistance than ever.

Further, in cargo railways, recently, railway transport has become more overcrowded. Therefore, there is a concern that fatigue damage will occur from the inside of a rail head portion (position at a depth of 20 to 30 mm from the outer surface of the head portion in a shape of an unused rail).

From this background, there has been a demand for development of high-strength rails with improved wear resistance and internal fatigue damage resistance.

In order to improve the wear resistance of rail steel, high-strength rails described in Patent Documents 1 and 2, for example, have been developed. The main characteristics of these rails are the hardness of steel being increased by refining lamellar spacing in a pearlite structure using a heat treatment in order to improve the wear resistance and the increased volume ratio of cementite in lamellar of a pearlite structure due to an increase in the amount of carbon of steel.

Specifically, Patent Document 1 discloses that a rail with excellent wear resistance is obtained by performing accelerated cooling on a rail head portion which is rolled or re-heated at a cooling rate of 1° C./sec to 4° C./sec from the temperature of an austenite region to a range of 850° C. to 500° C.

In addition, Patent Document 2 discloses that a rail having excellent wear resistance can be obtained by increasing the volume ratio of cementite in lamellar of a pearlite structure using hyper-eutectoid steel (C: greater than 0.85% and 1.20% or less).

In the technologies disclosed in Patent Documents 1 and 2, the wear resistance of a certain region can be improved by refining the lamellar spacing in the pearlite structure in order to improve the hardness and increase the volume ratio of cementite in lamellar of the pearlite structure.

However, in the rails disclosed in Patent Documents 1 and 2, internal fatigue damage cannot be suppressed.

In consideration of the above-described problems, high-strength rails as described in Patent Documents 3 and 4, for example, have been suggested. The main characteristics of these rails are control of pearlitic transformation by adding a small amount of alloy or the hardness of the inside of a head portion being improved by precipitating a small amount of alloy in a pearlite structure in order to improve internal fatigue damage resistance, in addition to improvement of wear resistance.

Specifically, Patent Document 3 discloses that the hardness of the inside of the head portion is improved by adding B to hyper-eutectoid steel (C: greater than 0.85% and 1.20% or less) so that the pearlitic transformation temperature in the inside of the head portion is controlled. Further, Patent Document 4 discloses that the hardness of the inside of the head portion is improved by adding V and N to hyper-eutectoid steel (C: greater than 0.85% and 1.20% or less) and precipitating V carbonitrides in the pearlite structure.

In Patent Document 3 or 4, the wear resistance is improved by increasing the volume ratio of cementite in lamellar of the pearlite structure and the hardness of the inside of the head portion is improved by controlling the pearlitic transformation temperature in the inside of the head portion or strengthening precipitation of the pearlite structure so that the internal fatigue damage resistance of a certain region can be improved. However, in techniques of Patent Documents 3 and 4, since the chemical composition are based on hyper-eutectoid steel (C: greater than 0.85% and 1.20% or less) having a large amount of carbon, the toughness of the pearlite structure is low and brittle cracks may occur in the inside of the head portion. Accordingly, in the use of rails in a severe railroad environment which has been required in recent years, sufficient characteristics were not able to be obtained and thus further improvement of the internal fatigue damage resistance has been a problem. In addition, in the techniques of Patent Documents 3 and 4, there has been a problem in that the hardness is not sufficiently improved due to a change in production conditions and thus the internal fatigue damage resistance may be decreased.

In consideration of such problems, for example, Patent Document 5 suggests a new high-strength rail with improved wear resistance and internal fatigue damage resistance which are required for a rail. The main characteristics are the amount of carbon being reduced to improve the toughness of the pearlite structure and a small amount of alloy being added to improve the internal fatigue damage resistance so that the hardness of the inside of the head portion is improved by precipitation hardening. Specifically, in Patent Document 5, the hardness of the inside of the head portion is improved by controlling Mn content and the Cr content and adding V and N based on eutectoid steel (C: 0.73% to 0.85%) having a pearlite structure with excellent toughness.

However, in the technique disclosed in Patent Document 5, abnormal structures such as a bainite or a martensite harmful to the wear resistance are generated depending on the production conditions even when the Mn content and the Cr content are controlled. Further, even when V and N are added and the ratio between V and N is controlled, the particle size or the distribution of a V nitride is not sufficiently controlled, an increase in hardness of the inside of the head portion becomes excessive, and a sufficient increase in hardness of the inside of the head portion is not obtained and, accordingly, the internal fatigue damage occurs. Therefore, the objectives are prevention of generation of abnormal structures, improvement of wear resistance, stable generation of V-based precipitates, and improvement of internal fatigue damage resistance.

As described above, a high-strength rail which can be used in cargo railways in a severe railroad environment and has excellent wear resistance and internal fatigue damage resistance has not been provided.

PRIOR ART DOCUMENT

Patent Document

[Patent Document 1] Japanese Examined Patent Application, Second Publication No. S63-023244

[Patent Document 2] Japanese Unexamined Patent Application, First Publication No. H08-144016

[Patent Document 3] Japanese Patent (Granted) Publication No. 3445619

[Patent Document 4] Japanese Patent (Granted) Publication No. 3513427

[Patent Document 5] Japanese Unexamined Patent Application, First Publication No. 2009-108396

DISCLOSURE OF THE INVENTION

Problems to be Solved by the Invention

The present invention has been made in consideration of the above-described problems and an object of the present invention is to provide a rail with improved wear resistance and internal fatigue damage resistance which are required for a rail used in cargo railways particularly in a severe railroad environment.

Means for Solving the Problem (1) According to an aspect of the present invention, there is provided a rail including, in terms of mass %: C: 0.75% to 0.85%; Si: 0.10% to 1.00%; Mn: 0.30% to 1.20%; Cr: 0.20% to 0.80%; V: 0.01% to 0.20%; N: 0.0040% to 0.0200%; Mo: 0% to 0.50%; Co: 0% to 1.00%; B: 0% to 0.0050%; Cu: 0% to 1.00%; Ni: 0% to 1.00%; Nb: 0% to 0.0500%; Ti: 0% to 0.0500%; Mg: 0% to 0.0200%; Ca: 0% to 0.0200%; REM: 0% to 0.0500%; Zr: 0% to 0.0200%; Al: 0% to 1.00%; P≤0.0250%; S≤0.0250%; and Fe and impurities as a remainder, the following Expressions 1 and 2 are satisfied, a structure of a range between an outer surface of a head portion as an origin and a depth of 25 mm includes 95% or greater of a pearlite structure and a hardness of the structure is in a range of Hv 350 to 480, 50 to 500 V carbonitride having an average grain size of 5 to 20 nm are present per 1.0 μm² of an area to be inspected in a transverse cross section at a position having the depth of 25 mm from the outer surface of the head portion, and the value obtained by subtracting the hardness of the position having the depth of 25 mm from the outer surface of the head portion from the hardness of a position having a depth of 2 mm from the outer surface of the head portion is in a range of Hv 0 to Hv 40.

$$1.00 < Mn/Cr \leq 4.00 \qquad \text{Expression a}$$

$$0.30 \leq 0.25 \times Mn + Cr \leq 1.00 \qquad \text{Expression b}$$

Here, the symbols of elements described in the Expressions a and b indicate the amount of each element in terms of mass %.

(2) In the rail according to (1), when a number of carbon atoms is defined as CA and a number of nitrogen atoms is defined as NA in the V carbonitride, the ratio CA/NA which is a ratio of CA to NA may be 0.70 or less.

(3) The rail according to (1) or (2) may include, in terms of mass %, at least one selected from the group consisting of: Mo: 0.01% to 0.50%; Co: 0.01% to 1.00%; B: 0.0001% to 0.0050%; Cu: 0.01% to 1.00%; Ni: 0.01% to 1.00%; Nb: 0.0010% to 0.0500%; Ti: 0.0030% to 0.0500%; Mg: 0.0005% to 0.0200%; Ca: 0.0005% to 0.0200%; REM: 0.0005% to 0.0500%; Zr: 0.0001% to 0.0200%; and Al: 0.0100% to 1.00%.

Effects of the Invention

According to the aspect of the present invention, the wear resistance and the internal fatigue damage resistance of the rail can be improved by controlling the composition of alloy, structures, number of V carbonitride of rail steel (steel serving as the material of the rail), controlling the hardness of the surface of the head portion or the inside of the head portion, controlling a difference in hardness between the surface of the head portion and the inside of the head portion, and controlling the composition of V carbonitride. Further, when such a rail is used, the service life of the rail in a case of being used in cargo railways can be greatly improved.

EMBODIMENTS OF THE INVENTION

Figure 1:
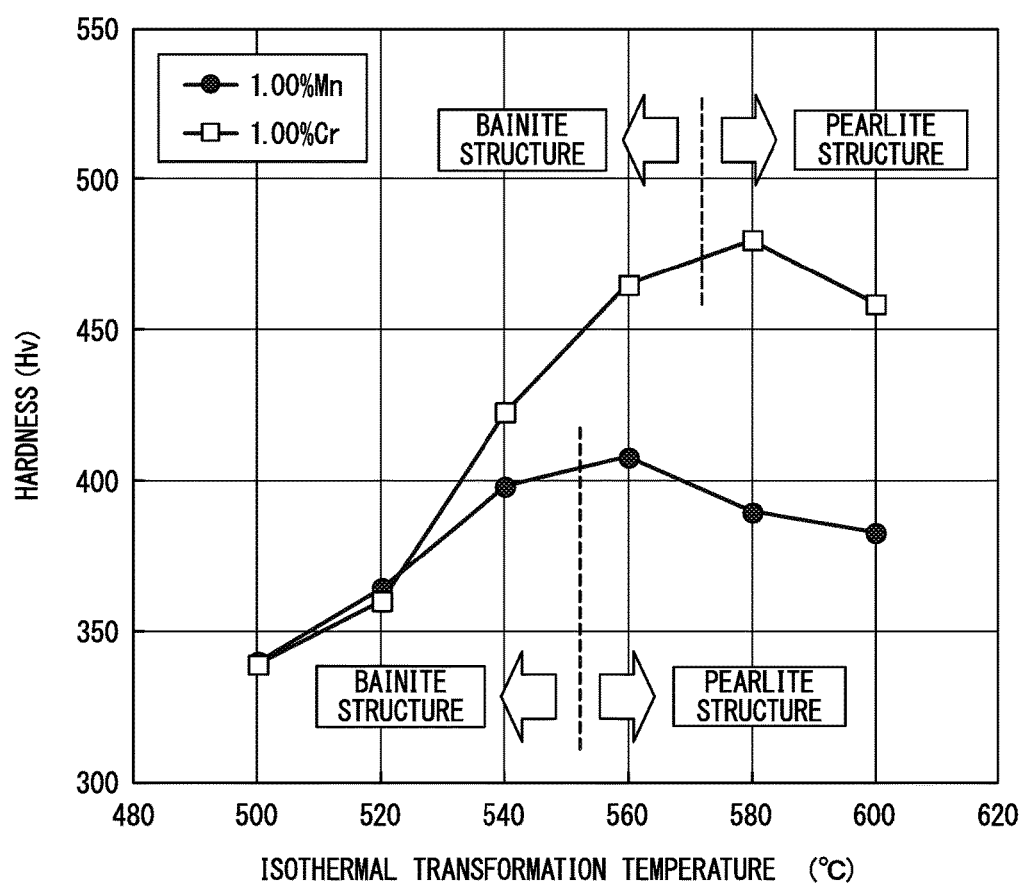
FIG. 1 is a diagram showing the relationship of the isothermal transformation temperature, the hardness, and the metallographic structure.

Hereinafter, a rail having excellent wear resistance and internal fatigue damage resistance according to an embodiment of the present invention (hereinafter, also referred to as the rail according to the present embodiment) will be described in detail. Hereinafter, "mass %" in the composition is simply described as "%".

The rail according to the present embodiment has the following characteristics.

(i) The rail has a predetermined chemical composition and satisfies expressions of 1.00<Mn/Cr≤4.00 and 0.30≤0.25×Mn+Cr≤1.00

(ii) A structure to a depth of 25 mm from an outer surface of a head portion as the origin includes 95% or greater of a pearlite structure and the Vickers hardness of the structure is in a range of Hv 350 to 480.

(iii) 50 to 500 V carbonitride having an average particle size of 5 to 20 nm are present per 1.0 μm² of an area to be inspected in a transverse cross section at a position having a depth of 25 mm from the outer surface of the head portion as the origin.

(iv) The value obtained by subtracting the hardness of the position at a depth of 25 mm from the outer surface of the head portion as the origin from the hardness of the position at a depth of 2 mm from the outer surface of the head portion as the origin is in a range of Hv 0 to Hv 40.

(v) When the number of carbon atoms is set to CA and the number of nitrogen atoms is set to NA in the V carbonitride, the ratio CA/NA which is the ratio of CA to NA is preferably 0.70 or less.

<Reason for Limiting Metallographic Structure and Required Regions of Pearlite Structure>

In the rail according to the present embodiment, it is necessary that 95% or greater (area ratio) of the area at a depth of 25 mm from the outer surface of the head portion as the origin be set to the pearlite structure.

First, the reason for setting the area ratio of the pearlite structure to 95% or greater will be described.

In the rail head portion that comes into contact with wheels, wear resistance is considered to be the most important thing to ensure. As the result of investigation of the relationship between the metallographic structure and the wear resistance conducted by the present inventors, it was confirmed that the pearlite structure has the best wear resistance. Further, the hardness (strength) of the pearlite structure is easily obtained even when the amount of alloy elements is small and the internal fatigue damage resistance thereof is excellent. Therefore, for the purpose of improving the wear resistance and the internal fatigue damage resistance, the area ratio of the pearlite structure is limited to 95% or greater. When the area ratio of pearlite structure is less than 95%, the wear resistance and the internal fatigue damage resistance are not sufficiently improved.

Next, the reason for limiting the required range of the metallographic structure (structure including pearlite) including the pearlite having an area ratio of 95% or greater to a range to at least a depth of 25 mm from the outer surface of the head portion (surface of head corner portions and a head top portion) as the origin will be described.

When the range of the structure including the pearlite is less than a depth of 25 mm from the outer surface of the head portion as the origin, if the wear at the time of use is considered, the region is not sufficient as the region for which the wear resistance or the internal fatigue damage resistance of the rail head portion is required, and the wear resistance and the internal fatigue damage resistance cannot be sufficiently improved. As the result, the rail service life is difficult to sufficiently improve. Therefore, it is preferable that a range to a depth of about 30 mm from the outer surface of the head portion as the origin is set to the structure having the pearlite in order to further improve the wear resistance and the internal fatigue damage resistance.

Figure 6:
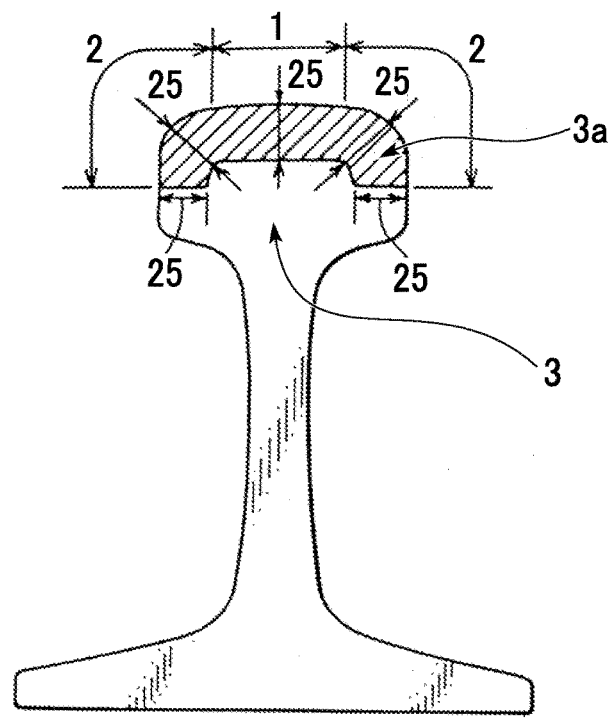
FIG. 6 is a diagram showing names of each position on the cross section of the head portion and a region, for which the pearlite structure is required, of the rail according to the present embodiment.

FIG. 6 shows the names of each position on the cross section of the head portion of the rail and the region, for which a structure including the pearlite is required, of the rail according to the present embodiment. First, the rail head portion indicates a portion upper than the portion constricted which is located in the center of the rail in the height direction when the rail is seen from the cross section as denoted by the reference numeral 3 of FIG. 6. Further, the rail head portion 3 includes a head top portion 1 and head corner portions 2 positioned on both ends of the head top portion 1. One head corner portion 2 is a gauge corner (G. C.) portion mainly coming into contact with wheels. Further, the outer surface of the head portion indicates both of the surface of the head top portion 1 facing the upper side when the rail is upright and the surfaces of the head corner portions 2, in the rail head portion 3. The positional relationship between the head top portion 1 and the head corner portions 2 is that the head top portion 1 is positioned in approximately the center of the rail head portion in the width direction and the head corner portions 2 are positioned on both sides of the head top portion 1.

The range to a depth of 25 mm from the surface of the head corner portions 2 and the head top portion 1 (outer surface of the head portion) as the origin is referred to as a head surface portion (3a, hatched portion). As shown in FIG. 6, when a structure (metallographic structure including the pearlite at an area ratio of 95% or greater) including the pearlite with a predetermined hardness is disposed on the head surface portion 3a to a depth of 25 mm from the surface of the head corner portions 2 and the head top portion 1 (outer surface of the head portion), the wear resistance and the internal fatigue damage resistance of the rail are improved.

Therefore, it is preferable that the structure including the pearlite is disposed on the head surface portion 3a in which wheels and the rail are mainly in contact and the wear resistance and the internal fatigue damage resistance are required. These characteristics are not required in a portion other than the head surface portion, the area ratio of the pearlite structure in a portion other than the head surface portion may or may not be 95% or greater.

Moreover, when the area ratio of the pearlite structure is 95% or greater, a small amount of a pro-eutectoid ferrite, a pro-eutectoid cementite, a bainite structure, or a martensite structure other than the pearlite structure may be mixed into the metallographic structure of the head surface portion 3a of the rail according to the present embodiment by 5% or less in terms of the area ratio. Even if these structures are mixed into the metallographic structure, when the area ratio thereof is 5% or less, the wear resistance of the surface of the head portion and the internal fatigue damage resistance of the inside of the head portion are not adversely and greatly affected. In other words, in the metallographic structure of the rail head portion of the rail according to the present embodiment, 95% or greater of the head surface portion in terms of the area ratio may be the pearlite structure and it is preferable that 98% or greater of the metallographic structure of the head surface portion of the rail head portion is set to the pearlite structure in order to sufficiently improve the wear resistance or the internal fatigue damage resistance. The area ratio of pearlite structure may be 100%.

The area ratio of pearlite structure in a range between the outer surface of the head portion as the origin and a depth of 25 mm can be acquired according to the following method. That is, the area ratio of the pearlite structure can be determined by observing the metallographic structure in the visual field of an optical microscope of 200 magnifications and determining the area of each metallographic structure. Further, 10 or more visual fields (10 sites) are used as the visual fields of the optical microscope described above and the average value of the area ratios can be used as the area ratio of the observed portion.

A method of evaluating the metallographic structure is as follows.

Pre-processing: 3% nital etching treatment after diamond polishing performed on sample Observation of structure: optical microscope (200 magnifications)

Visual fields: 10 or more

Determination of structure: determination is made based on textbooks of metallography (for example, "Introduction to Structures and Properties of metallic materials and Heat Treatment Utilizing Materials and Structure Control": The Japan Society for Heat Treatment), SEM observation in a case where structure is unclear Determination of ratio: the area of each structure is measured, the area ratio in a visual field is calculated, and the average value of the entire visual field is set to a representative value of the portion. Further, the area ratio of a structure can be obtained by enclosing a predetermined structure with a continuous line based on the above-described determination of a structure, acquiring the area of a region in the line according to image analysis, and calculating the ratio of the area thereof to the area of the entire observation visual fields.

In the rail according to the present embodiment, when the area ratio of the pearlite structure of a position at a depth of 2 mm from the outer surface of the head portion as the origin and a position at a depth of 25 mm from the outer surface of the head portion as the origin is respectively 95% or greater, it can be said that 95% or greater of the metallographic structure in a range between the outer surface of the head portion as the origin and at least a depth of 25 mm is the pearlite structure.

<Reason for Limiting Hardness of Structure Including Pearlite>

Next, the reason for limiting the hardness of the structure including the pearlite in the rail according to the present embodiment to a range of Hv 350 to 480 will be described.

The hardness of the metallographic structure including the pearlite required for ensuring the wear resistance and the internal fatigue damage resistance of the rail was examined by the present inventors. Specifically, a rail in which the hardness of the rail head portion is changed was produced for trial by performing rolling and a heat treatment using a steel material (eutectoid steel) containing chemical compositions which are 0.80% C, 0.50% Si, 0.70% Mn, 0.50% Cr, 0.0150% P, and 0.0120% S. Further, in the trial rail, the relationship between the hardness of the rail head portion and the wear resistance and the surface damage resistance and the relationship between the hardness and the internal fatigue damage resistance were investigated by performing a wear test using test pieces machined from the rail head portion and a rolling contact fatigue test using an actual rail. As the result, in order to ensure the wear resistance, the surface damage resistance, and the internal fatigue damage resistance of the rail head portion, it was confirmed that the hardness of the metallographic structure including the pearlite in a range between the outer surface of the head portion as the origin and a depth of 25 mm needs to be controlled to be in a range of Hv 350 to 480.

When the hardness of the structure including the pearlite is less than Hv 350, wear progresses and the wear resistance required for the rail head portion is difficult to ensure. Further, in the inside of the head portion, fatigue cracks occur and propagate and the internal fatigue damage resistance is degraded. Further, when the hardness of of the structure including the pearlite is greater than Hv 480, in the surface of the head portion, fine cracks occur in the outer surface of the head portion which comes into contact with wheels and the surface damage resistance becomes difficult to ensure due to embrittlement of the structure including the pearlite. For this reason, the hardness of the structure including the pearlite is limited to be in a range of Hv 350 to 480.

The hardness of the structure including the pearlite is measured by performing measurement on 10 or more points (10 sites) in a measurement position (for example, a position at a depth of 2 mm from the outer surface of the head portion as the origin) and employing the average value as the hardness of the position. In the rail of the present embodiment, the area ratio of the pearlite structure is 95% or greater, but other structures (pro-eutectoid cementite, pro-eutectoid ferrite, martensite, bainite, and the like) are present at an area ratio of 5% or less. Therefore, the hardness of the structure including the pearlite may not be a representative value when the measurement is performed on one point.

Conditions for measuring the hardness are described below.

Device: Vickers hardness tester (load of 98 N)

Collection of test pieces for measurement: machining sample out from transverse cross section of rail head portion Pre-processing: polishing transverse cross section with diamond abrasive grains having average grain size of 1 μm Measurement method: carried out in conformity with JIS Z 2244

Measurement: 10 points or more

Hardness: the average value of measured point is set as a representative value at a depth position In the rail according to the present embodiment, when the hardness of a position at a depth of 2 mm from the outer surface of the head portion as the origin and the hardness of a position at a depth of 25 mm from the outer surface of the head portion are respectively in a range of Hv 350 to 480, it can be said that the hardness of the range at least at a depth of 25 mm from the outer surface of the head portion as the origin is in a range of Hv 350 to 480.

<Reason for Limiting Difference Between Hardness of Surface of Head Portion (Position at Depth of 2 mm from Outer Surface of Head Portion as Origin) and Hardness of Inside of Head Portion (Position at Depth of 25 mm from Outer Surface of Head Portion as Origin)> and <Reason for Limiting Number of V Carbonitride Having an Average Grain Size of 5 to 20 nm>

Next, the reason for limiting a difference (value obtained by subtracting the hardness of the position at a depth of 25 mm from the outer surface of the head portion as the origin from the hardness of the position at a depth of 2 mm from the outer surface of the head portion as the origin) in hardness between the surface of the head portion and the inside of the head portion to a range of Hv 0 to Hv 40 and the reason for limiting the number of V carbonitride having an average grain size of 5 to 20 nm to a range of 50 to 500 per 1.0 μm$^2$ of an area to be inspected in a transverse cross section at a position having a depth of 25 mm from the outer surface of the head portion as the origin will be described.

Figure 9:
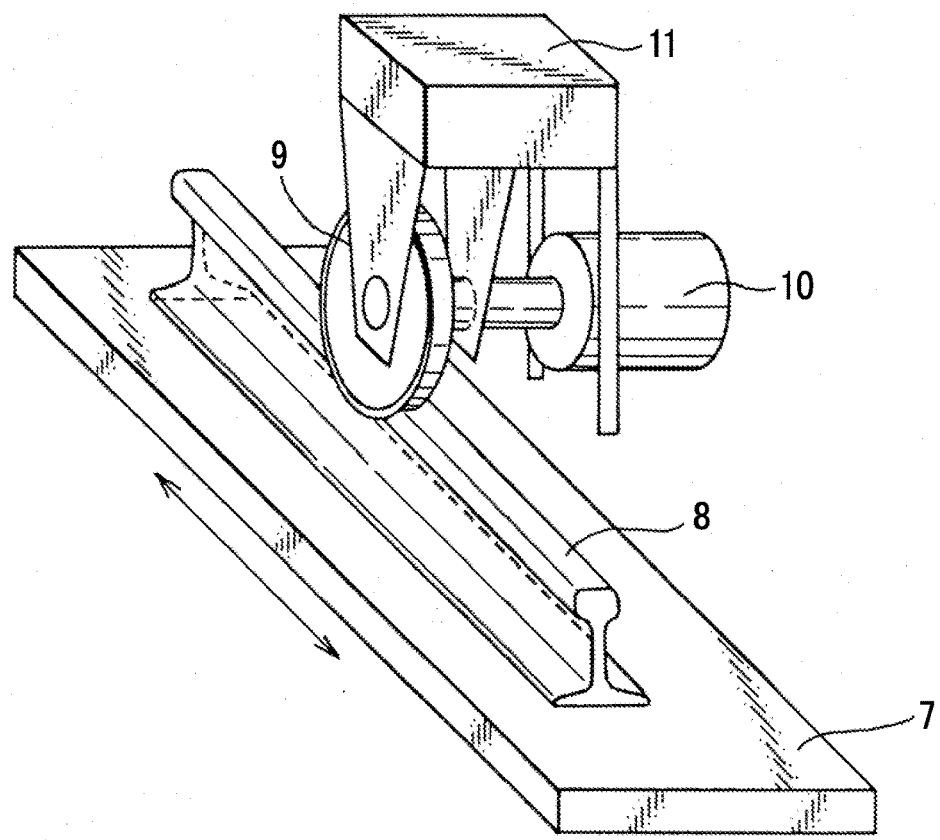
FIG. 9 is a view showing the outline of the rolling contact fatigue test.

A rolling contact fatigue test is performed by the present inventors using a rolling contact fatigue testing machine shown in FIG. 9 under conditions in which the shape of a test piece is set to a 141 lbs rail 8 with an entire length of 2 m, the type of a wheel 9 is set to an AAR type having a diameter of 920 mm, the radial load is set to be in a range of 50 to 300 kN, the thrust load is set to 20 kN, lubrication is made by oil which is intermittently supplied, and the maximum number of repetition is set to 2 million, in rails of the related art. After the test, the state of occurrence of fatigue damage in the inside of the head portion is investigated in details.

As the result, it was confirmed that cracks occur in the inside of the head portion. Since the cracks in the inside of the head portion greatly affect the basic performance of the rail, it is necessary to prevent occurrence of cracks in order to ensure safety. The present inventors examined a method of preventing occurrence of cracks.

For the purpose of reducing strain concentration on the inside of the head portion which occurs due to the contact with wheels, the present inventors examined a method of further improving the hardness of the inside of the head portion, decreasing a difference in hardness between the surface of the head portion and the inside of the head portion, and adjusting the material strength in the cross section of the head portion to be as uniform as possible.

Further, generation of V carbonitride precipitated in ferrite of the pearlite structure is considered to be effective for improving the hardness of the inside of the head portion and control of V carbonitride which are easily precipitated in ferrite of the pearlite structure is examined.

The precipitates in the inside of the head portion and the hardness of the head portion were investigated by performing a hot rolling and a heat treatment for promoting the generation of V carbonitride on a steel in which the V content is changed by a range of 0.01% to 0.20% and the N content is changed by a range of 0.0040% to 0.0200% based on the steel material (eutectoid steel) having chemical compositions of 0.80% C, 0.50% Si, 0.50% Mn, 0.40% Cr, 0.0150% P, and 0.0120% S. The heat treatment is performed with accelerated cooling and controlled cooling after hot rolling is finished. The test conditions are as follows.

[Actual Rail Rolling, Heat Treatment Test]
Chemical Compositions of Steel
0.80% C, 0.50% Si, 0.50% Mn, 0.40% Cr, 0.0150% P, 0.0120% S, V: 0.01% to 0.20%, and N: 0.0040% to 0.0200% (remainder is formed of Fe and impurities)
Rail shape
141 lbs (weight: 70 kg/m)
Conditions for hot rolling and heat treatment
Final rolling temperature (outer surface of head portion): 950° C.
Conditions for heat treatment: heat treatment is performed in the following order:
(1) rolling;
(2) natural air cooling; and
(3) accelerated cooling and controlled cooling.
Conditions for accelerated cooling (outer surface of head portion): performing cooling to temperature range of 800° C. to 590° C. at cooling rate of 3° C./sec
Conditions for controlled cooling (outer surface of head portion): holding temperature range of 580° C. to 640° C. for 100 to 200 sec after accelerated cooling is stopped and then performing air cooling
Holding of temperature during controlled cooling: temperature is controlled by repeatedly performing and stopping accelerated cooling according to recuperation from inside of rail

[Method of Investigating V Carbonitride]
Pre-processing: machining samples from transverse cross section of rail, and performing thin film processing or replica collection (method of exposing precipitates by electrolytic etching or chemical etching and peeling precipitates off using film)
Collection position: inside of head portion (position at depth of 25 mm from outer surface of head portion as origin)
Measurement method
Device: transmission electron microscope
Magnifications: 50000 to 500000
Number of visual fields for observation: 20 visual fields
Selection of precipitates: The precipitates generated in ferrite of the pearlite structure are identified with a transmission electron microscope (TEM) using a thin film or a replica sample. The V carbonitride are determined by performing composition analysis on the precipitates using an energy dispersive X-ray spectroscopy device (EDX) or performing element analysis through crystal structural analysis of an electron beam diffraction image using a TEM. During the determination, a precipitate from which carbon or nitrogen, in addition to V, is simultaneously detected is set to a target of evaluation, in each of the precipitates. The precipitates as an evaluation target contain at least V and carbon, V and nitrogen, or V, carbon, and nitrogen and may contain other alloy elements.

Measurement of grain size of precipitates: The area of precipitates serving as the above-described evaluation target is acquired and the average grain size is calculated using the diameter of a circle corresponding to the area.

Evaluation: As the result of calculation, the average value is acquired by selecting precipitates having a grain size of 5 to 20 nm, counting the number of V carbonitride having a predetermined diameter, and converting the number of V carbonitride to the number per unit area.

[Measurement Method and Measurement Conditions of Hardness of Rail Head Portion]
Measurement of hardness
Device: Vickers hardness tester (load of 98 N)
Collection of test pieces for measurement: machining sample out from transverse cross section of rail head portion
Pre-processing: polishing transverse cross section with diamond abrasive grains having average grain size of 1 μm
Measurement method: carried out in conformity with JIS Z 2244
Calculation of hardness
Surface of head portion: Measurement is performed on arbitrary 20 sites at a depth of 2 mm from the outer surface of the head portion and the average value thereof is set to the hardness of the surface of the head portion.
Inside of head portion: Measurement is performed on arbitrary 20 sites at a depth of 25 mm from the outer surface of the head portion and the average value thereof is set to the hardness of the inside of the head portion.

Figure 4:
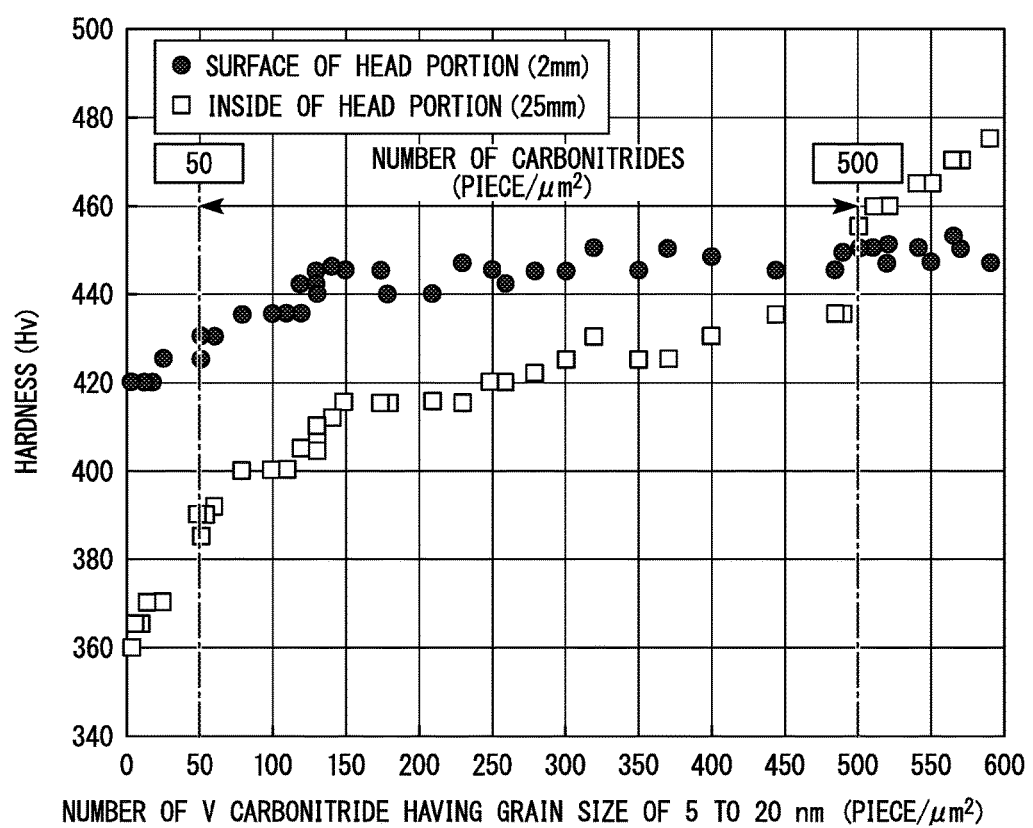
FIG. 4 is a diagram showing the relationship between the number (piece/μm²) of V carbonitride having a grain size of 5 to 20 nm per unit area (1.0 μm²) and the hardness of the rail head portion.

As the result of detailed investigation of the relationship between the hardness of the head portion and precipitates generated in the inside of the head portion of the rail subjected to hot rolling and a heat treatment, it is understood that a certain amount of V carbonitride in the pearlite structure can be generated by containing V and N and controlling the conditions for the heat treatment carried out after hot rolling. Further, as shown in FIG. 4, it was confirmed that the hardness of the inside of the head portion (position at a depth of 25 mm from the outer surface of the head portion) is greatly improved by controlling the number of V carbonitride having an average grain size of 5 to 20 nm. In addition, it was confirmed that the hardness of the inside of the head portion is controlled to be lower than the hardness of the surface of the head portion and a difference in hardness between the surface of the head portion and the inside of the head portion can be reduced to Hv 40 or less by controlling the number of V carbonitride having an average grain size of 5 to 20 nm in the inside of the head portion (position at a depth of 25 mm from the outer surface of the head portion as the origin) to be in a range of 50 to 500 pieces/$\mu m^2$.

Next, in order to verify the effects of the difference in hardness, a rolling contact fatigue test is performed using a rolling contact fatigue testing machine shown in FIG. 9 under conditions in which the shape of a test piece is set to a 141 lbs rail 8 with an entire length of 2 m, the type of the wheel 9 is set to an AAR type having a diameter of 920 mm, the radial load is set to be in a range of 50 to 300 kN, the thrust load is set to 20 kN, lubrication is made by oil which is intermittently supplied, and the maximum number of repetition is set to 2 million, in rails. After the test, the occurrence of fatigue damage in the inside of the head portion is investigated in detail.

As the result, it was confirmed that there are no remaining cracks in the inside of the head portion of the rail in which the difference in hardness is controlled to Hv 40 or less and the internal fatigue damage resistance of the rail is greatly improved.

As described above, the hardness of the inside of the head portion is controlled to be lower than the hardness of the surface of the head portion and the difference in hardness between the surface of the head portion and the inside of the head portion can be reduced to Hv 40 or less by controlling the number of V carbonitride having an average grain size of 5 to 20 nm in the inside of the head portion (position at a depth of 25 mm from the outer surface of the head portion as the origin) to be in a range of 50 to 500 pieces/$\mu m^2$. Further, there are no remaining cracks in the inside of the head portion of the rail in which the difference in hardness is controlled to be Hv 40 or less so that the internal fatigue damage resistance of the rail is greatly improved.

Therefore, the number density of V carbonitride having an average grain size of 5 to 20 nm on the transverse cross section in a position at a depth of 25 mm from the outer surface of the head portion as the origin is set to be in a range of 50 to 500 pieces per 1.0 $\mu m^2$ of an area (that is, 50 to 500 pieces/$\mu m^2$) to be inspected and the difference (that is, (the hardness of the surface of the head portion) minus (the hardness of the inside of the head portion)) between the hardness of the surface of the head portion and the hardness of the inside of the head portion is controlled to be Hv 40 or less.

When the amount of V carbonitride having an average grain size of 5 to 20 nm to be generated is less than 50 per 1.0 $\mu m^2$ of an area to be inspected, the hardness of the inside of the head portion (position at a depth of 25 mm from the outer surface of the head portion as the origin) is not sufficiently increased and the internal fatigue damage resistance is not improved. Meanwhile, the number density of V carbonitride is greater than 500 per 1.0 $\mu m^2$ of an area to be inspected, an increase in hardness of the inside of the head portion (position at a depth of 25 mm from the outer surface of the head portion as the origin) becomes excessive, the hardness of the inside of the head portion is more increased than the hardness of the surface of the head portion, and thus the strain of the rail which is generated by an external force due to the contact with wheels or the like is concentrated on a region having a small hardness on the surface of the head portion. As the result, fine cracks occur in the surface of the head portion and the surface damage resistance is degraded. Therefore, the number of V carbonitride having an average grain size of 5 to 20 nm, which are present in a position at a depth of 25 mm from the outer surface of the head portion as the origin is limited to a range of 50 to 500 per 1.0 $\mu m^2$ of an area to be inspected.

In addition, the cooling rate of each site on the cross section in the rail head portion varies. Typically, there is a tendency that the distribution of hardness is decreased from the surface of the head portion toward the inside of the head portion. When the difference between the hardness of the surface of the head portion and the hardness of the inside of the head portion is greater than Hv 40, a change in material strength in the cross section of the rail head portion becomes significantly large and thus the strain of the rail which is generated from the external force due to the contact with wheels or the like is concentrated on a region having a small hardness of the inside of the head portion. As the result, fine cracks occur and remain in the inside of the head portion and further improvement of the internal fatigue damage resistance becomes difficult.

In addition, the above-described difference in hardness indicates a difference in hardness between the surface of the head portion and the inside of the head portion. Typically, there is a tendency that the hardness is decreased from the surface of the head portion toward the inside of the head portion as described above. Accordingly, the difference in hardness between the surface of the head portion and the inside of the head portion is a positive value. However, when the bainite is generated in the surface of the head portion due to failure of controlling the conditions for a heat treatment or the like, the hardness of the inside of the head portion is occasionally more increased than the hardness of the surface of the head portion. As the result, the difference in hardness between the surface of the head portion and the inside of the head portion is a negative value in some cases. Even in this case, similar to the case where V carbonitride are excessively generated, the strain of the rail which is generated from an external force due to the contact with wheels or the like is concentrated on a region having a low hardness on the surface of the head portion. As the result, fine cracks occur in the surface of the head portion and the surface damage resistance is degraded.

The reason for selecting, as the surface of the head portion, the position at a depth of 2 mm from the outer surface of the head portion as the origin and the position at a depth of 25 mm from the outer surface of the head portion as the origin is that the positions show the wear resistance and the internal fatigue damage resistance as a product rail in a most significant manner. The wear resistance and the internal fatigue damage resistance of the rail according to the present embodiment can be improved by controlling the hardness of these positions or the difference in hardness between these positions. The method of measuring the hardness is as described above. The position for measuring the hardness may be arbitrarily selected, as long as the conditions are satisfied, so as to obtain values representing the entire region from the head top portion to the head corner portion of the rail.

<Reason for Limiting Ratio (CA/NA) of Number of Carbon Atoms (CA) to Number of Nitrogen Atoms (NA) of V Carbonitride>

From the viewpoint of further improving the safety, measures to improve the characteristics at the time of long-term use are examined by the present inventors. As the result of detailed observation on the rail after the fatigue test, it was confirmed that fine cracks occasionally occur in the periphery of V carbonitride. The present inventors examined the method of eliminating these fine cracks.

Here, the relationship between the composition of V carbonitride and fine cracks occurring in the periphery thereof is detailed investigated by the present inventors. The investigation method is as follows.

[Method of Investigating Fine Cracks]

Preparation of sample

The rail is machined and a sample is prepared from a position at a depth of 25 mm from the outer surface of the head portion in the inside of the head portion as the origin.

Pre-processing: polishing cross section with diamond
       advasive grains
    Observation method
    Device: scanning electron microscope
    Magnifications: 10000 to 100000
    Observation position: detailed observation on periphery of V carbonitride having average grain size of 5 to 20 nm (The method of measuring the average grain size is the same as described above.)

[Method of Investigating Composition of V Carbonitride]

Position for collecting samples: inside of head portion (position at depth of 25 mm from the outer surface of head portion as origin)

Pre-processing: needle sample is processed (10 μm×10 μm×100 μm) according to focused ion beam (FIB) method Measuring device: three-dimensional atom probe (3DAP) method Measurement method A voltage is applied to the needle sample to release metal ions and the metal ions are detected using a coordinate detector. The type of element is identified based on the ion flight time and the element position or the number of atoms in three dimensions is specified based on the detected coordinates.

Voltage: DC, pulse (pulse rate of 20% or greater)
Sample temperature: 40 K or lower
Calculation ratio of number of carbon atoms to number of nitrogen atoms of V carbonitride The number of carbon atoms and the number of nitrogen atoms of V carbonitride are calculated based on the information of the element positions or the amounts thereof described above. The number of carbon atoms and the number of nitrogen atoms contained in V carbonitride are respectively counted from the results of 3DAP. The ratio (CA/NA) of the number of carbon atoms (CA) to the number of nitrogen atoms (NA) is calculated from the results.

Number of times of measurement: 5 or more points are measured and the average value is set to the representative value.

Figure 5:
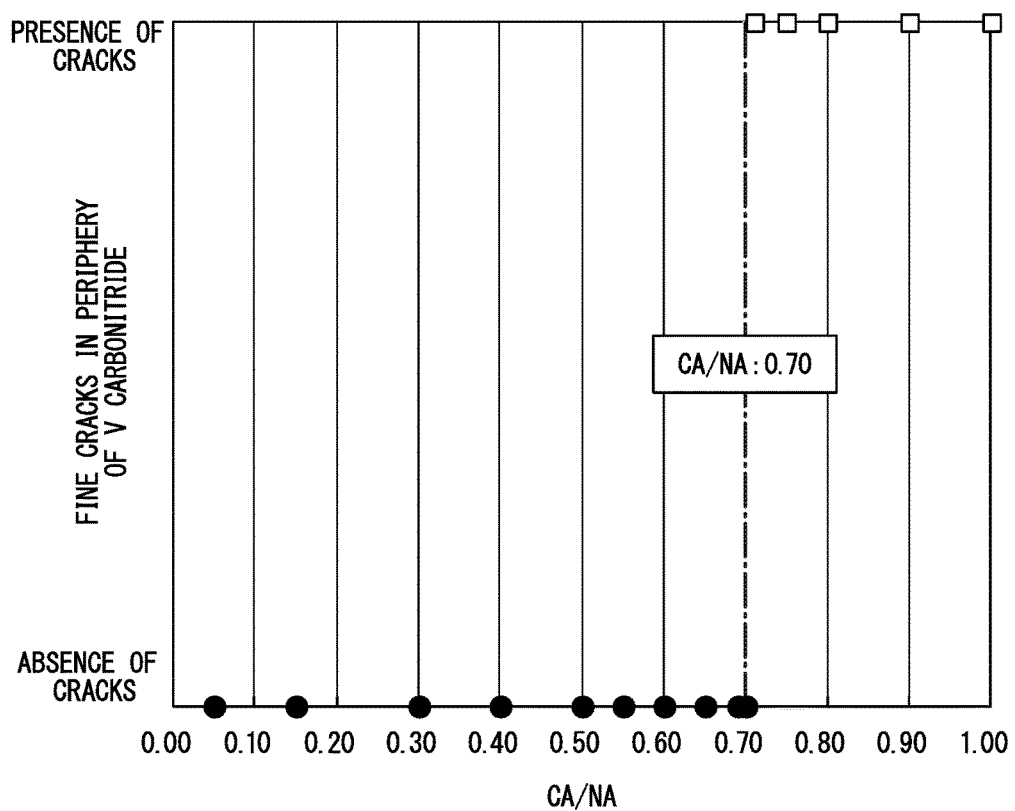
FIG. 5 is a diagram showing the relationship between a ratio (CA/NA) of the number of carbon atoms (CA) to the number of nitrogen atoms (NA) of the carbonitrides and the presence or absence of fine cracks in the periphery of the V carbonitride during a rolling contact fatigue test.

As the result of investigation, it was confirmed that the state of occurrence of cracks is greatly changed by the combination of the number of carbon atoms and the number of nitrogen atoms of V carbonitride. Further, as the result of detailed investigation, it was found that occurrence of fine cracks and the number of carbon atoms (CA) and the number of nitrogen atoms (NA) of V carbonitride are correlated and the hardness of V carbonitride tends to be increased and the amount of cracks to occur in a parent phase in the periphery thereof tends to be increased when the amount of carbides is increased. As the result of further investigation, as shown in FIG. 5, it was confirmed that fine cracks are eliminated by controlling the ratio (CA/NA) of the number of carbon atoms (CA) to the number of nitrogen atoms (NA) to 0.70 or less.

From these results, it was found that, preferably, the number of V carbonitride are controlled and the composition of V carbonitride as the origin of cracks is controlled in order to suppress and prevent cracks in the inside of the head portion and occurrence of fine cracks and further improve the basic performance of the rail.

<Reason for Limiting Chemical Compositions of Rail>

The reason for limiting the chemical compositions of rail steel (steel serving as the material of the rail) in the rail according to the present embodiment will be described in detail.

C: 0.75% to 0.85%

C is an element effective for promoting pearlitic transformation and ensuring wear resistance. When the C content is less than 0.75%, in the present chemical composition, the minimum strength and wear resistance required for the rail cannot be maintained. Further, a pro-eutectoid ferrite is generated and the wear resistance is greatly degraded. Further, a soft pro-eutectoid ferrite in which fatigue cracks easily occur in the inside of the head portion is likely to be generated and internal fatigue damage resistance is likely to be generated. Meanwhile, when the C content is greater than 0.85%, the toughness of the pearlite structure is degraded, brittle cracks occur in the inside of the head portion, and the internal fatigue damage resistance is degraded. Further, the pro-eutectoid cementite is likely to be generated in the inside of the head portion, fatigue cracks occur from the interface between the pearlite structure and the pro-eutectoid cementite, and then the internal fatigue damage resistance is likely to be generated. Therefore, the C content is adjusted to be in a range of 0.75% to 0.85%. In order to stabilize generation of the pearlite structure and improve the internal fatigue damage resistance, it is preferable that the C content is adjusted to be in a range of 0.80% to 0.85%.

Si: 0.10% to 1.00%

Si is an element which is dissolved in solid in ferrite of the pearlite structure, increases the hardness (strength) of the rail head portion, and improves the wear resistance. However, when the Si content is less than 0.10%, these effects cannot be sufficiently obtained. Meanwhile, when the Si content is greater than 1.00%, a large amount of surface cracks are generated at the time of hot rolling. In addition, the hardenability is significantly increased, the martensite structure is likely to be generated in the rail head portion so that the wear resistance is degraded. Therefore, the Si content is adjusted to be in a range of 0.10% to 1.00%. It is preferable that the Si content is adjusted to be in a range of 0.20% to 0.80% in order to further stabilize generation of the pearlite structure and further improve the wear resistance or the internal fatigue damage resistance.

Mn: 0.30% to 1.20%

Mn is an element which increases the hardenability, stabilizes pearlitic transformation, refines the lamellar spacing of the pearlite structure, and ensures the hardness of the pearlite structure so that the wear resistance or the internal fatigue damage resistance is further improved. However, when the Mn content is less than 0.30%, the wear resistance is not improved. Further, a soft pro-eutectoid ferrite in which fatigue cracks easily occur in the inside of the head portion is generated and the internal fatigue damage resistance is difficult to ensure. Meanwhile, when the Mn content is greater than 1.20%, the hardenability is significantly increased, and the martensite structure is generated in the rail head portion so that the wear resistance or the surface damage resistance is degraded. Therefore, the Mn addition content is adjusted to be in a range of 0.30% to 1.20%. It is preferable that the Mn content is adjusted to be in a range of 0.40% to 1.00% in order to stabilize generation of the pearlite structure and improve the wear resistance or the internal fatigue damage resistance.

Cr: 0.20% to 0.80%

Cr is an element which refines the lamellar spacing of the pearlite structure and improves the hardness (strength) of the pearlite structure by increasing the equilibrium transformation temperature and increasing the supercooling degree. Further, the refining of the lamellar spacing and the improvement of the hardness of the pearlite structure contribute to improvement of wear resistance and internal fatigue damage resistance. However, when the Cr content is less than 0.20%, the effects described above are small and the effects of improving the hardness of rail steel cannot be obtained. Meanwhile, when the Cr content is greater than 0.80%, the hardenability is significantly increased, the bainite structure or the martensite structure is generated in the rail head portion, and thus the wear resistance or the surface damage resistance is degraded. Therefore, the Cr content is set to be in a range of 0.20% to 0.80%. It is preferable that the Cr content is set to be in a range of 0.40% to 0.75% in order to stabilize generation of the pearlite structure and improve the wear resistance or the internal fatigue damage resistance.

V: 0.01% to 0.20%

V is an element which is precipitated as a V carbonitride during a cooling process after hot rolling, increases the hardness (strength) of the pearlite structure using precipitation hardening, and improves the internal fatigue damage resistance in the inside of the head portion. However, when the V content is less than 0.01%, the number of fine carbonitrides to be precipitated in ferrite of the pearlite structure is small and the hardness (strength) of the inside of the head portion is not improved. Meanwhile, when the V content is greater than 0.20%, the number of fine V carbonitride becomes excessive, the hardness of the inside of the head portion is more increased than the hardness of the surface of the head portion, and the strain of the rail which is generated from the external force due to the contact with wheels or the like is concentrated on a region having a low hardness on the surface of the head portion. As the result, fine cracks occur in the surface of the head portion and the surface damage resistance is degraded. Therefore, the V content is set to be in a range of 0.01% to 0.20%. It is preferable that the V content is set to be in a range of 0.03% to 0.10% in order to stabilize generation of the pearlite structure and improve the internal fatigue damage resistance.

N: 0.0040% to 0.0200%

N is an element which promotes precipitation of V carbonitride during the cooling process after hot rolling when N and V are added at the same time. When V carbonitride is precipitated, the hardness (strength) of the pearlite structure is increased and the internal fatigue damage resistance is improved. However, when the N content is less than 0.0040%, the number of fine carbonitrides to be precipitated in ferrite of the pearlite structure is small and the hardness (strength) of the inside of the head portion is not improved. Meanwhile, when the N content is greater than 0.0200%, it becomes difficult for N to be solid-soluted in steel. In this case, bubbles as the origin of fatigue damage are generated so that the internal fatigue damage is likely to occur. Therefore, the N content is set to be in a range of 0.0040% to 0.0200%. It is preferable that the N content is set to be in a range of 0.0060% to 0.0150% in order to stabilize generation of the pearlite structure and improve the internal fatigue damage resistance.

P: 0.0250% or Less

P is an element (impurity) which is unavoidably contained in steel and the content thereof can be controlled by performing refining in a converter. It is preferable that the P content is small. However, when the P content is greater than 0.0250%, the pearlite structure is embrittled and brittle cracks occur in the inside of the head portion so that the internal fatigue damage resistance is degraded. Therefore, the P content is limited to 0.0250% or less. The lower limit of the P content is not limited, but the lower limit thereof at the time of actual production is approximately 0.0050% when desulfurization capacity during the refining process is considered.

S: 0.0250% or Less

S is an element (impurity) which is unavoidably contained in steel and the content thereof can be controlled by performing desulfurization in a cupola pot. It is preferable that the S content is small. However, when the S content is greater than 0.0250%, inclusions of coarse MnS-based sulfides are likely to be generated, fatigue cracks occur in the inside of the head portion due to stress concentration on the periphery of the inclusions, and thus the internal fatigue damage resistance is degraded. Therefore, the S content is limited to 0.0250% or less. The lower limit of the S content is not limited, but the lower limit thereof at the time of actual production is approximately 0.0050% when desulfurization capacity during the refining process is considered.

Basically, the rail according to the present embodiment contains the above-described chemical elements and the remainder is formed of Fe and impurities. However, in place of a part of Fe in the remainder, the remainder may further contain at least one selected from the group consisting of Mo, Co, B, Cu, Ni, Nb, Ti, Mg, Ca, REM, Zr, and Al, in ranges described below, for the purpose of improving the wear resistance and the internal fatigue damage resistance due to an increase in hardness (strength) of the pearlite structure, improving the toughness, preventing a heat affected zone of welded joint from being softened, and controlling distribution of the hardness in the cross section in the inside of the head portion. Specifically, Mo increases the equilibrium transformation point, refines the lamellar spacing of the pearlite structure, and improves the hardness. Co refines the lamellar structure on the wear surface and increases the hardness of the wear surface. B reduces cooling rate dependence of the pearlitic transformation temperature to make distribution of the hardness in the cross section of the rail head portion uniform. Cu is dissolved in solid in ferrite of the pearlite structure and increases the hardness. Ni improves the toughness and hardness of the pearlit structure e and prevents the heat affected zone of the welded joint from being softened. Nb and Ti improve the fatigue strength of the pearlite structure by precipitation hardening of a carbide and a nitride generated during a hot rolling and a cooling process carried out after the hot rolling. Further, Nb and Ti make a carbide or a nitride be stably generated at the time of re-heating and prevent the heat affected zone of the welded joint from being softened. Mg, Ca, and REM finely disperse MnS-based sulfides and decrease the internal fatigue damage occurring from inclusions. Zr suppresses formation of a segregating zone of a cast slab or bloom central portion and suppresses generation of a pro-eutectoid cementite or the martensite by increasing the equiaxed crystal ratio of the solidification structure. Consequently, these elements may be contained in order to obtain the above-described effects. In addition, even if the amount of each element is equal to or smaller than the range described below, the characteristics of the rail according to the present embodiment are not damaged. Further, since these elements are not necessarily contained, the lower limit thereof is 0%.

Mo: 0.01% to 0.50%

Mo is an element which refines the lamellar spacing of the pearlite structure and improves the hardness (strength) of the pearlite structure so that the wear resistance and the internal fatigue damage resistance are improved by increasing the equilibrium transformation temperature and increasing the supercooling degree. However, when the Mo content is less than 0.01%, the effects described above are small and the effects of improving the hardness of rail steel cannot be obtained. Meanwhile, when the Mo content is greater than 0.50%, the transformation rate is significantly decreased, the martensite structure with low toughness is generated in the rail head portion, and thus the wear resistance is degraded. Therefore, it is preferable that the Mo content is set to be in a range of 0.01% to 0.50% when Mo is contained.

Co: 0.01% to 1.00%

Co is an element which is dissolved in solid in ferrite of the pearlite structure, refines the lamellar structure of the pearlite structure directly beneath the rolling surface resulting from the contact with wheels, and increases the hardness (strength) of the pearlite structure so that the wear resistance and the internal fatigue damage resistance are improved. However, when the Co content is less than 0.01%, the refining of the lamellar structure is not promoted and thus the effects of improving the wear resistance or the internal fatigue damage resistance cannot be obtained. Meanwhile, when the Co content is greater than 1.00%, the above-described effects are saturated and the lamellar structure in accordance with the content cannot be refined. Further, economic efficiency is decreased due to an increase in alloying addition cost. Therefore, it is preferable that the Co content is set to be in a range of 0.01% to 1.00% when Co is contained.

B: 0.0001% to 0.0050%

B is an element which forms iron borocarbides ($Fe_{23}(CB)_6$) in austenite grain boundaries and reduces cooling rate dependence of the pearlitic transformation temperature by promoting pearlitic transformation. Further, B is an element which imparts more uniform distribution of the hardness to a range from the outer surface of the head portion to the inside thereof and increases the service life of the rail. However, when the B content is less than 0.0001%, the effects described above are not sufficient and improvement of distribution of the hardness in the rail head portion is not recognized. Meanwhile, when B content is greater than 0.0050%, coarse iron borocarbides are generated, brittle fracture is generated, and the toughness of the rail is degraded. Therefore, it is preferable that the B content is set to be in a range of 0.0001% to 0.0050% when B is contained.

Cu: 0.01% to 1.00%

Cu is an element which is dissolved in solid in ferrite of the pearlite structure and improves the hardness (strength) resulting from solid solution strengthening. As the result, the wear resistance and the internal fatigue damage resistance are improved. However, when the Cu content is less than 0.01%, the effects cannot be obtained. Meanwhile, when the Cu content is greater than 1.00%, the martensite structure is generated in the rail head portion due to significant improvement of hardenability and thus the wear resistance is degraded. Therefore, it is preferable that the Cu content is set to be in a range of 0.01% to 1.00% when Cu is contained.

Ni: 0.01% to 1.00%

Ni is an element which improves the toughness of the pearlite structure and improves the hardness (strength) resulting from solid solution strengthening. As the result, the wear resistance and the internal fatigue damage resistance are improved. Further, Ni is an element which is finely precipitated in the welded heat affected zone as an intermetallic compound of $Ni_3Ti$ in the form of a composite with Ti and suppresses softening due to precipitation strengthening. In addition, Ni is an element which suppresses embrittlement of grain boundaries in steel containing Cu. However, when the Ni content is less than 0.01%, these effects are extremely small. Meanwhile, when the Ni content is greater than 1.00%, the martensite structure is generated in the rail head portion and the wear resistance is degraded due to significant improvement of hardenability. Therefore, it is preferable that the Ni content is set to be in a range of 0.01% to 1.00% when Ni is contained.

Nb: 0.0010% to 0.0500%

Nb is an element which is precipitated as a Nb carbide and/or a Nb nitride during a cooling process after hot rolling, increases the hardness (strength) of the pearlite structure by precipitation hardening, and improves the wear resistance and the internal fatigue damage resistance. Further, Nb is an element effective for preventing the heat affected zone of the welded joint from being softened by being stably generated as a Nb carbide or a Nb nitride from a low temperature range to a high temperature range, in the heat affected zone re-heated to a temperature range lower than or equal to the Ac1 point. However, when the Nb content is less than 0.0010%, these effects cannot be sufficiently obtained and improvement of the hardness (strength) of the pearlite structure is not recognized. Meanwhile, when Nb content is greater than 0.0500%, precipitation hardening resulting from the Nb carbide or the Nb nitride becomes excessive, the pearlite structure is embrittled, and then the internal fatigue damage resistance of the rail is degraded. Therefore, it is preferable that the Nb content is set to be in a range of 0.0010% to 0.0500% when Nb is contained.

Ti: 0.0030% to 0.0500%

Ti is an element which is precipitated as a Ti carbide and/or a Ti nitride during a cooling process after hot rolling, increases the hardness (strength) of the pearlite structure by precipitation hardening, and improves the wear resistance and the internal fatigue damage resistance. Further, Ti is an element effective for preventing the welded joint from being embrittled by refining the structure of the heat affected zone heated to the austenite region because the precipitated Ti carbide or Ti nitride is not dissolved at the time of re-heating during welding. However, when the Ti content is less than 0.0030%, these effects are small. Meanwhile, when the Ti content is greater than 0.0500%, a Ti carbide and a Ti nitride which are coarse are generated, and fatigue cracks occur and the internal fatigue damage resistance is degraded due to the stress concentration. Therefore, it is preferable that the Ti content is set to be in a range of 0.0030% to 0.0500% when Ti is contained.

Mg: 0.0005% to 0.0200%

Mg is an element which is bonded to S to form a sulfide. MgS finely disperses MnS so that stress concentration is relaxed and the internal fatigue damage resistance is improved. However, when the Mg content is less than 0.0005%, these effects are small. Meanwhile, when the Mg content is greater than 0.0200%, a coarse oxide of Mg is generated, and fatigue cracks occur and the internal fatigue damage resistance is degraded due to the stress concentration. Therefore, it is preferable that the Mg content is set to be in a range of 0.0005% to 0.0200% when Mg is contained.

Ca: 0.0005% to 0.0200%

Ca is an element which has a strong bonding force to S and forms CaS (sulfide). CaS finely disperses MnS so that the stress concentration is relaxed and the internal fatigue damage resistance is improved. However, when the Ca content is less than 0.0005%, these effects are small. Meanwhile, when the Ca content is greater than 0.0200%, a coarse oxide of Ca is generated, and fatigue cracks occur and the internal fatigue damage resistance is degraded due to the stress concentration. Therefore, it is preferable that the Ca content is set to be in a range of 0.0005% to 0.0200% when Ca is contained.

REM: 0.0005% to 0.0500%

REM is a deoxidation and desulfurization element and generates oxysulfide ($REM_2O_2S$) of REM serving as a nucleus that generates Mn sulfide-based inclusions when REM is contained. Further, since the melting point of the oxysulfide ($REM_2O_2S$) is high, stretching of the Mn sulfide-based inclusions after hot rolling is suppressed. As the result, when REM is contained, MnS is finely dispersed, the stress concentration is relaxed, and the internal fatigue damage resistance is improved. However, when the REM content is less than 0.0005%, REM becomes insufficient as the nucleus that generates MnS-based sulfides and the effects are small.

Meanwhile, when the REM content is greater than 0.0500%, oxysulfide ($REM_2O_2S$) of hard REM is generated, and fatigue cracks occur and the internal fatigue damage resistance is degraded due to the stress concentration. Therefore, it is preferable that the REM content is set to be in a range of 0.0005% to 0.0500% when REM is contained.

Further, REM is a rare earth metal such as Ce, La, Pr, or Nd. The content described above is obtained by limiting the total amount of REM. When the total amount of the contents is in the above-described range, the same effects are obtained even when the form is either of a single element or a combination of elements (two or more kinds).

Zr: 0.0001% to 0.0200%

Zr is bonded to O and generates a $ZrO_2$ inclusion. Since this $ZrO_2$ inclusion has excellent lattice matching performance with γ-Fe, the $ZrO_2$ inclusion becomes a solidified nucleus of high carbon rail steel in which γ-Fe is a solidified primary phase and suppresses formation of a segregation zone in a central part of a cast slab or bloom by increasing the equiaxed crystal ratio of the solidification structure. In this manner, Zr is an element which suppresses generation of the martensite structure generated in a segregation portion of the rail. However, when the Zr content is less than 0.0001%, the number of $ZrO_2$-based inclusions to be generated is small and the inclusions do not sufficiently exhibit effects as solidified nuclei. In this case, the martensite is likely to be generated in the segregation portion, and accordingly, improvement of the internal fatigue damage resistance of the rail cannot be expected. Meanwhile, when the Zr content is greater than 0.0200%, a large amount of coarse Zr-based inclusions are generated, and fatigue cracks occur and the internal fatigue damage resistance is degraded due to the stress concentration. Therefore, it is preferable that the Zr content is set to be in a range of 0.0001% to 0.0200% when Zr is contained.

Al: 0.0100% to 1.00%

Al is an element which functions as a deoxidizer. Further, Al is an element which moves the eutectoid transformation temperature to a high temperature side, contributes to increasing the hardness (strength) of the pearlite structure, and thus improves the wear resistance or the internal fatigue damage resistance of the pearlite structure. However, when the Al content is less than 0.0100%, the effects thereof are small. Meanwhile, when the Al content is greater than 1.00%, it becomes difficult for Al to be dissolved in steel and thus coarse alumina-based inclusions are generated. Since these coarse Al-based inclusions are the origin of the fatigue cracks, the internal fatigue damage resistance is degraded. Further, an oxide is generated at the time of welding so that the weldability is significantly degraded. Therefore, it is preferable that the Al content is set to be in a range of 0.0100% to 1.00% when Al is contained.

<Reason for Limiting Value of Mn/Cr>

In the rail according to the present embodiment, it is necessary that the value of the ratio (Expression 1) of the Mn content (Mn) to the Cr content (Cr) be set to greater than 1.00 and 4.00 or less in addition to the content of each element. The reason therefor will be described below.

The present inventors examined a method of preventing generation of abnormal structures such as martensite structure or bainite structure by stably generating the pearlite structure having a high hardness. Specifically, the present inventors examined the influence of the contents of Mn and Cr which are basic alloy element on generation of abnormal structures.

First, two kinds of test pieces of steel, which are steel (Mn steel) having a Mn content of 1.0% and steel (Cr steel) having a Cr content of 1.0% are produced based on a steel (eutectoid steel) having the composition of 0.80% C, 0.50% Si, Mn, Cr, 0.0150% P, and 0.0120% S, an isothermal transformation heat treatment is performed on the test pieces, and the relationship of the transformation temperature, the hardness, and the metallographic structure is investigated. The conditions for the test are as follows.

[Isothermal Transformation Heat Treatment Experiment]

Conditions for isothermal transformation heat treatment

Heating temperature and time: 1000° C.×5 min

Conditions for cooling: cooling from heating temperature to isothermal transformation temperature at cooling rate of 30° C./sec Conditions for isothermal transformation: isothermal transformation temperature of 500° C. to 600° C., holding time of 100 to 1000 sec After isothermal transformation: accelerated cooling (cooling to 50° C. at cooling rate of 30° C./sec)

Conditions for evaluating hardness and metallographic structure

Observation of Structure

Pre-processing: 3% nital etching treatment after diamond polishing performed on cross section Observation of structure: using optical microscope Measurement of Hardness Device: Vickers hardness tester (load of 98 N)

Pre-processing: diamond polishing performed on cross section

FIG. 1 shows the relationship of the isothermal transformation temperature, the hardness, and the metallographic structure.

In Mn steel (1.0% Mn), it was confirmed that the pearlitic transformation is stabilized to a low temperature range compared to that of Cr steel (1.0% Cr) and the pearlitic transformation easily occurs. That is, it was confirmed that generation of the bainite harmful to the wear resistance is suppressed in Mn steel (1.0% Mn) compared to Cr steel (1.0% Cr). When Cr steel is compared to Mn steel, the hardness of the pearlite structure of the Cr steel tends to be higher than that of Mn steel at the same transformation temperature.

From these results, it was understood that the balance between the Mn content and the Cr content is important in order to obtain a pearlite structure having a high hardness, and it is preferable to design elements to which Cr is supplementarily added to ensure the hardness while the Mn content which stabilizes generation of the pearlite structure is adjusted to be larger than the Cr content.

Next, the present inventors examined the optimum balance between the Mn content and the Cr content. The total of the Mn content and the Cr content is set to 1.4% and a test piece of steel in which the Mn content and the Cr content are changed is produced based on steel (eutectoid steel) having the composition of 0.80% C, 0.50% Si, Mn, Cr, 0.0150% P, and 0.0120% S. Further, the balance between Mn and Cr and the relationship between the hardness and the metallographic structure are examined by performing a continuous cooling heat treatment, in which the cooling of the surface of the head portion (position at a depth of 2 mm from the outer surface of the head portion as the origin) in actual rails is reproduced, on this test piece. The test conditions are as follows.

[Continuous Cooling Heat Treatment Experiment]

Chemical composition of steel 0.80% C, 0.50% Si, Mn: 0.05% to 1.40%, Cr: 0.05% to 1.40%, 0.0150% P, and 0.0120% S (remainder is Fe and impurities)

Conditions for continuous cooling heat treatment

Heating temperature and time: 1000° C.×5 min

Conditions for cooling: cooling from heating temperature to 50° C. at cooling rate of 3° C./sec (simulating cooling conditions in surface of head portion)

Conditions for evaluating hardness and metallographic structure

Observation of Structure

Pre-processing: 3% nital etching treatment after diamond polishing performed on cross section Observation of structure: observation using optical microscope Measurement of Hardness Device: Vickers hardness tester (load of 98 N)

Pre-processing: diamond polishing performed on cross section

Figure 2:
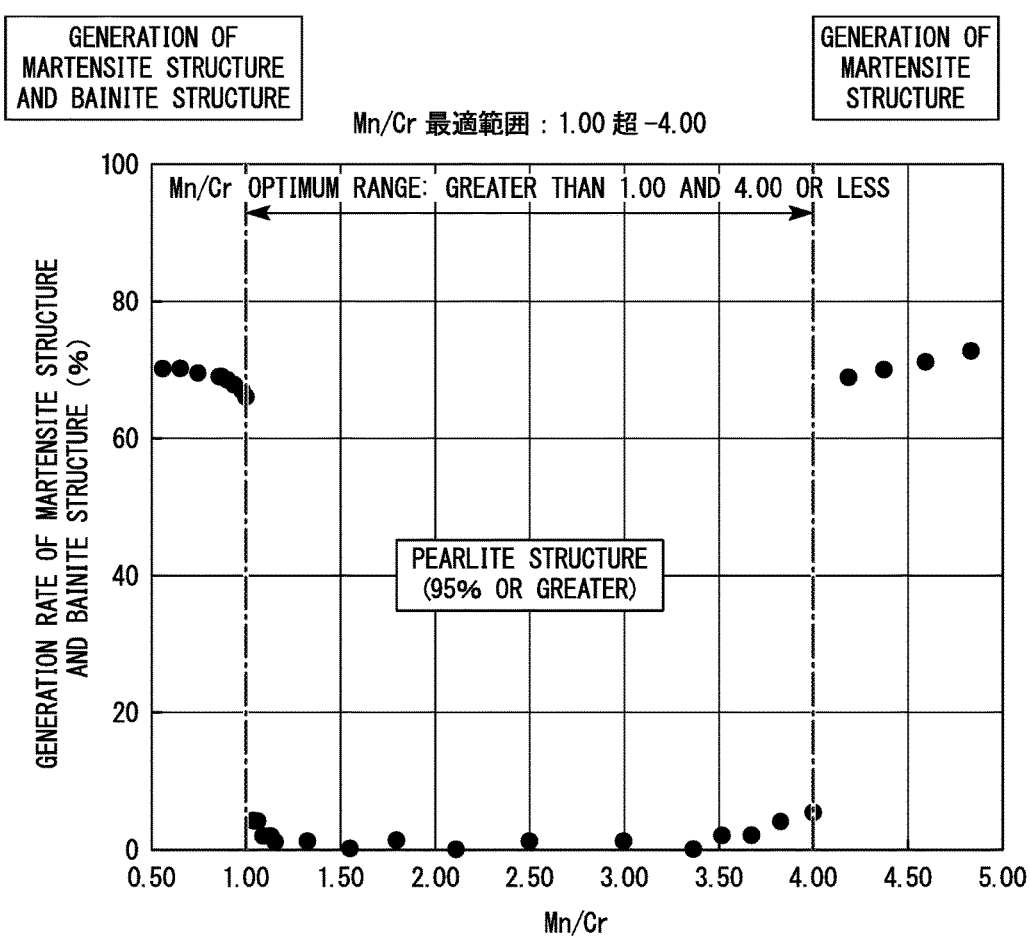
FIG. 2 is a diagram showing the relationship between the values of Mn/Cr defined in Expression 1 and the metallographic structure.

FIG. 2 shows the relationship between the value of Mn/Cr obtained from the Mn content and the Cr content and the metallographic structure. As shown in FIG. 2, when the value of Mn/Cr is 1.00 or less, the Cr content becomes excessive, and the bainite harmful to the wear resistance and the martensite harmful to the wear resistance or the surface damage resistance are generated. Meanwhile, when the value of Mn/Cr is greater than 4.00, the Mn content becomes excessive, and the martensite harmful to the wear resistance or the surface damage resistance is generated.

From these results, it was found that the Mn/Cr value needs to be controlled to greater than 1.00 and 4.00 or less (that is, the expression of 1.00<Mn/Cr≤4.00 is satisfied) in order to suppress generation of the bainite harmful to the wear resistance and the martensite harmful to the wear resistance or the surface damage resistance and stably obtain the pearlite structure having a high hardness, in the surface of the head portion.

<Reason for Limiting Value of 0.25×Mn+Cr>

Next, in the rail according to the present embodiment, the reason for limiting the total value of the Mn content (Mn) and the Cr content (Cr) to a range of 0.30 to 1.00 (0.30≤0.25×Mn+Cr≤1.00) will be described.

As described above, Mn and Cr affect ease of pearlitic transformation and the hardness of the pearlite structure. For this reason, the present inventors investigated the relationship between the Mn content and the Cr content and the hardness of the pearlite structure on the premise that the value of Mn/Cr is set to greater than 1.00 and 4.00 or less. Specifically, a test piece of steel in which the Mn content is changed to be in a range of 0.20% to 1.20% and the Cr content is changed to be in a range of 0.20% to 0.80% is produced based on a steel (eutectoid steel) containing chemical compositions of 0.80% C, 0.50% Si, Mn, Cr, 0.0150% P, and 0.0120% S. Further, the relationship between the Mn content and the Cr content and the hardness thereof was investigated by performing a continuous cooling heat treatment, in which the cooling of the surface of the head portion (position at a depth of 2 mm from the outer surface of the head portion as the origin) and the cooling of the inside of the head portion (position at a depth of 25 mm from the outer surface of the head portion as the origin) are reproduced, on these test pieces. The test conditions are as follows.

[Continuous Cooling Heat Treatment Experiment]

Chemical composition 0.80% C, 0.50% Si, Mn: 0.20% to 1.20%, Cr: 0.20% to 0.80%, 0.0150% P, and 0.0120% S (remainder is formed of Fe and impurities)

Conditions for continuous cooling heat treatment

Heating temperature and time: 1000° C.×5 min

Conditions for cooling in order to reproduce cooling the surface of head portion: cooling from heating temperature to 50° C. at cooling rate of 3° C./sec Conditions for cooling in order to reproduce cooling the inside of head portion: cooling from heating temperature to 50° C. at cooling rate of 1° C./sec Conditions for evaluating hardness and metallographic structure Observation of Structure Pre-processing: 3% nital etching treatment after diamond polishing performed on cross section Observation of structure: observation using optical microscope Measurement of Hardness Device: Vickers hardness teater (load of 98 N)

Pre-processing: diamond polishing performed on cross section

Figure 3:
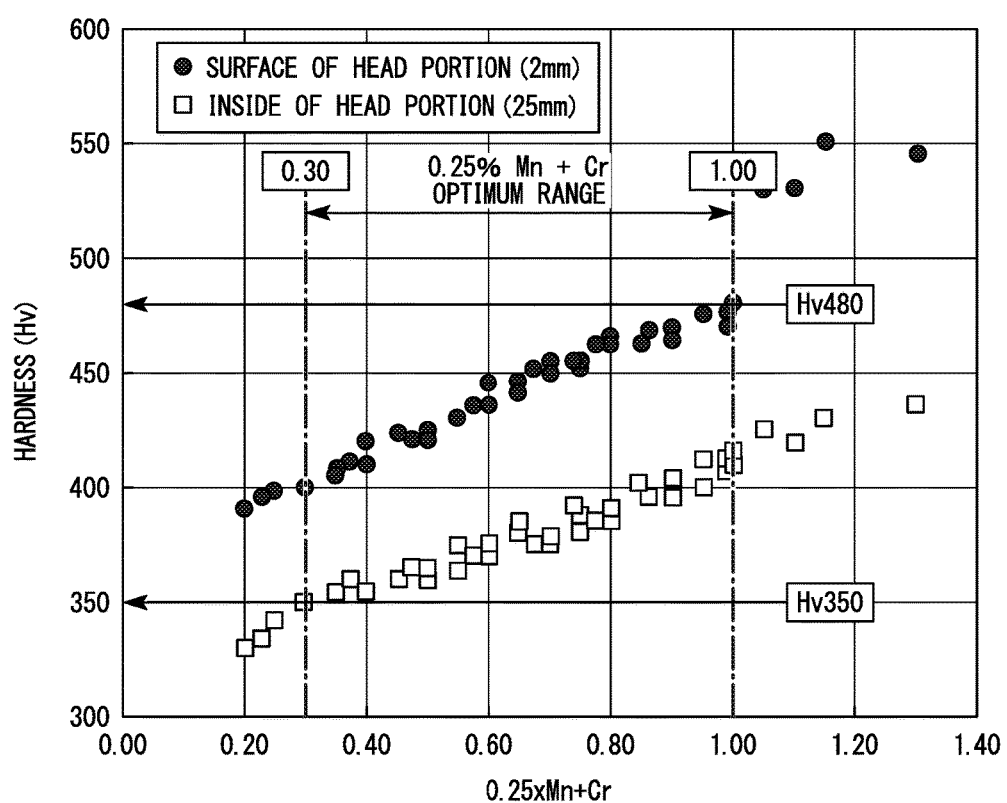
FIG. 3 is a diagram showing the relationship between the values of 0.25×Mn+Cr defined in Expression 2 and the hardness of a rail head portion.

As the result of analyzing the relationship between the amount of alloys and the hardness of the structure including the pearlite of steel on which the experiment of the continuous cooling heat treatment is performed, it was confirmed that both of the hardness of the structure including the pearlite of the surface of the head portion and the hardness of the structure including the pearlite of the inside of the head portion are correlated with a relational expression formed of the Mn content and the Cr content. FIG. 3 shows the relationship between the hardness and the value of 0.25×Mn+Cr (Expression 2) including the Mn content and the Cr content.

As shown in FIG. 3, when the value of (0.25×Mn+Cr) is controlled to 1.00 or less, the hardness of the structure including the pearlite in the surface of the head portion can be set to Hv 480 or less, which is the value in which the surface damage resistance can be ensured. Meanwhile, when the value of (0.25×Mn+Cr) is controlled to 0.30 or greater, the hardness of the structure including the pearlite in the inside of the head portion can be set to Hv 350 or greater, which is the value required for ensuring the wear resistance or the internal fatigue damage resistance. Therefore, the hardness which satisfies the wear resistance and the internal fatigue damage resistance can be ensured as the hardness of the structure including the pearlite in the rail head portion according to the present embodiment by controlling the chemical composition such that the value of (0.25×Mn+Cr) is in a range of 0.30 to 1.00 (that is, an expression of 0.30≤0.25×Mn+Cr≤1.00" is satisfied).

As shown in FIG. 3, when the value of 0.25×Mn+Cr is less than 0.30, the required hardness (Hv 350 or greater) of the pearlite structure that ensures the internal fatigue damage resistance in the inside of the head portion is difficult to ensure. Further, when the value of 0.25×Mn+Cr is greater than 1.00, the hardness of the pearlite structure in the surface of the head portion becomes excessive (greater than Hv 480), the pearlite structure is embrittled, fine cracks occur in the outer surface of the head portion which comes into contact with wheels, and thus the surface damage resistance becomes difficult to ensure.

In the rail according to the present embodiment, the wear resistance and the internal fatigue damage resistance of the rail in a case of being used in cargo railways can be improved and the service life can be greatly improved by controlling alloy composition of rail steel, structures, the hardness of the surface of the head portion or the inside of the head portion, the number of V carbonitride, and a difference in hardness between the surface of the head portion and the inside of the head portion and further controlling the composition of V carbonitride.

Next, a preferable production method of the rail according to the present embodiment will be described.

When the rail according to the present embodiment includes the above-described chemical compositions, structures, and the like, the effects thereof can be obtained regardless of the production method. However, since the rail according to the present embodiment is stably obtained, it is preferable that the production method including the following process is used.

The rail according to the present embodiment can be produced by performing smelting the steel in a melting furnace such as a converter or an electric furnace which is typically used, performing casting according to an ingot-making and blooming method or a continuous casting method on the molten steel having chemical compositions adjusted to have the above-described ranges to obtain a slab or bloom, performing hot rolling on the slab or bloom so as to be formed in a rail shape, and performing a heat treatment after hot rolling.

In these series of processes, it is necessary to control the conditions for hot rolling and the conditions for the heat treatment after hot rolling according to the required hardness of the rail head portion in order to control the hardness of the rail head portion. As the conditions for hot rolling and the conditions for the heat treatment after hot rolling, it is preferable that the hot rolling and the heat treatment are performed under the following conditions in order to maintain the pearlite structure and control the structure of the rail head portion and the hardness of the surface of the head portion or the inside of the head portion. Further, the temperature of the surface of the head portion and the temperature of the outer surface of the head portion are substantially the same as each other.

Conditions for hot rolling
Final hot rolling temperature of outer surface of head portion: 900° C. to 1000° C.
Final reduction (area reduction ratio): 2% to 20%
Conditions for heat treatment after hot rolling (outer surface of head portion): performing natural air cooling for 60 to 180 sec after hot rolling and then performing accelerated cooling and controlled cooling
Accelerated cooling (outer surface of head portion)
Cooling rate: 2° C./sec to 8° C./sec
Start temperature: 750° C. or higher, stop temperature: 580° C. to 640° C.
Controlled cooling (outer surface of head portion)
Holding temperature of outer surface of head portion to range of 580° C. to 640° C. for 100 to 200 sec after stopping of accelerated cooling and then performing air cooling
Temperature holding during controlled cooling: temperature is controlled to predetermined range by repeatedly performing and stopping accelerated cooling according to recuperation from inside of rail
In a case of prevent fine cracks occurring in the periphery of carbonitrides by controlling the ratio (CA/NA) of the number of carbon atoms (CA) to the number of nitrogen atoms (NA) of V carbonitride, it is preferable that the conditions for accelerated cooling and the conditions for controlled cooling are changed into the following conditions.
Conditions for heat treatment (outer surface of head portion): performing natural air cooling for 60 to 180 sec after rolling and then performing accelerated cooling and controlled cooling
Accelerated cooling (outer surface of head portion):
Cooling rate: 2° C./sec to 8° C./sec
Start temperature: 750° C. or higher, stop temperature: 610° C. to 640° C.
Controlled cooling (outer surface of head portion):
Holding temperature of outer surface of head portion to range of 610° C. to 640° C. for 100 to 200 sec after stopping of accelerated cooling and then performing air cooling
Temperature holding during controlled cooling: temperature is controlled to predetermined range by repeatedly performing and stopping accelerated cooling according to recuperation from inside of rail First, the reason why it is preferable that the final hot rolling temperature (outer surface of the head portion) is set to be in a range of 900° C. to 1000° C. will be described.

When the final hot rolling temperature (outer surface of the head portion) is lower than 900° C., refining of austenite grains after hot rolling becomes significant. In this case, the hardenability is greatly degraded and the hardness of the rail head portion is unlikely to be ensured in some cases. Further, when the final hot rolling temperature (outer surface of the head portion) is higher than 1000° C., austenite grains after hot rolling become coarse, the hardenability is excessively increased, and the bainite harmful to the wear resistance is easily generated in the rail head portion. Therefore, it is preferable that the final hot rolling temperature (outer surface of the head portion) is set to be in a range of 900° C. to 1000° C.

Next, the reason why it is preferable that the final reduction (reduction of area) is set to be in a range of 2% to 20% will be described.

When the final reduction (reduction of area) is less than 2%, austenite grains after hot rolling become coarse, the hardenability is excessively increased, the bainite harmful to the wear resistance is easily generated in the rail head portion, the grain size of the pearlite structure becomes coarse, and the ductility or the toughness required for the rail cannot be ensured in some cases. Meanwhile, when the final reduction (reduction of area) is greater than 20%, refining of austenite grains after hot rolling becomes significant, the hardenability is greatly degraded, and the hardness of the rail head portion is unlikely to be ensured. Therefore, it is preferable that the final reduction (reduction of area) is set to be in a range of 2% to 20%.

The conditions for hot rolling of the rail head portion is not particularly limited. It is sufficient to control the final hot rolling temperature through caliber or universal rolling of a typical rail in order to ensure the hardness of the rail head portion. As a hot rolling method, for example, a method described in Japanese Unexamined Patent Application, First Publication No. 2002-226915 may be used such that the pearlite structure is mainly obtained. That is, rough hot rolling is performed on a slab or bloom, intermediate hot rolling is performed over a plurality of passes using a reverse mill, and then finish rolling is performed two passes or more using a continuous mill. The temperatures may be controlled to be in the above-described temperature range at the time of the final hot rolling of the finish hot rolling.

Next, the reason why it is preferable that the cooling rate of accelerated cooling (outer surface of the head portion) is set to be in a range of 2° C./sec to 8° C./sec.

When the cooling rate is less than 2° C./sec, the pearlitic transformation is started in a high temperature region on the way of the accelerated cooling. As the result, in the chemical composition of the rail according to the present embodiment, a portion having a hardness of less than Hv 350 is generated in the head surface portion of the rail head portion, and the wear resistance or the internal fatigue damage resistance required for the rail is unlikely to be ensured in some cases. Meanwhile, when the cooling rate is greater than 8° C./sec, in the chemical composition of the rail according to the present embodiment, the bainite structure or the martensite structure is generated in the head surface portion and thus the wear resistance or the toughness of the rail may be degraded. Therefore, it is preferable that the cooling rate is set to be in a range of 2° C./sec to 8° C./sec.

Next, the reason why it is preferable that the start temperature of accelerated cooling is set to 750° C. or higher and the stop temperature thereof is set to be in a range of 580° C. to 640° C. will be described.

When the start temperature of accelerated cooling of the outer surface of the head portion is lower than 750° C., the pearlite structure is occasionally generated in a high temperature region before accelerated cooling. In this case, a predetermined hardness is not obtained and the wear resistance or the surface damage resistance required for the rail is unlikely to be ensured. Further, in steel having a relatively large amount of carbon, there are concerns that the pro-eutectoid cementite is generated, the pearlite structure is embrittled, and the toughness of the rail is degraded. Therefore, it is preferable that the temperature of the outer surface of the rail head portion at the time of starting accelerated cooling is set to 750° C. or higher.

In addition, when the stop temperature of accelerated cooling is higher than 640° C., the pearlitic transformation is started in a high temperature region immediately after cooling and a large amount of the pearlite structure having a low hardness is generated. As the result, the hardness of the head portion cannot be ensured and the wear resistance or the surface damage resistance required for the rail is unlikely to be ensured in some cases. Further, when the stop temperature of accelerated cooling is set to lower than 580° C., there is a case that a large amount of the bainite structure harmful to the wear resistance is generated immediately after cooling. In this case, the wear resistance required for the rail is unlikely to be ensured. Therefore, it is preferable that the stop temperature of accelerated cooling is set to be in a range of 580° C. to 640° C.

Next, the reason for limiting conditions preferable for controlled cooling will be described. This process greatly affects the number of V carbonitride and the difference in hardness between the surface of the head portion and the inside of the head portion.

First, the reason why it is preferable that the holding temperature after accelerated cooling is set to be in a range of 580° C. to 640° C. will be described.

When the holding temperature is higher than 640° C., in the chemical composition of the rail according to the present embodiment, the pearlitic transformation is started in a high temperature region immediately after cooling and a large amount of the pearlite structure having a low hardness is generated. As the result, the hardness of the head portion cannot be ensured, and the wear resistance or the surface damage resistance required for the rail is unlikely to be ensured. Further, there is a concern that the V carbonitride generated in the inside of the head portion become coarse and the amount of precipitation strengthening is decreased so that the hardness cannot be improved. Meanwhile, the holding temperature is set to lower than 580° C., a large amount of the bainite structure harmful to the wear resistance is generated immediately after cooling. As the result, there is a concern that the wear resistance required for the rail is unlikely to be ensured. Further, generation of V carbonitride is suppressed so that the number of fine V carbonitride cannot be ensured in some cases. In this case, the hardness of the inside of the head portion is not improved and the internal fatigue damage resistance is unlikely to be improved. Therefore, it is preferable that the holding temperature after accelerated cooling is set to be in a range of 580° C. to 640° C.

Next, the reason why the time of holding the temperature is preferably set to be a range of 100 to 200 sec will be described.

When the holding time is longer than 200 sec, tempering of the pearlite structure progresses during the holding and the pearlite structure is softened. As the result, the hardness of the inside of the head portion cannot be ensured and the wear resistance or the internal fatigue damage resistance required for the rail is unlikely to be ensured. Further, generation of V carbonitride becomes insufficient and improvement of the hardness of the inside of the head portion cannot be expected. Meanwhile, when the holding time is set to shorter than 100 sec, generation of V carbonitride is not sufficient and the number of fine V carbonitride cannot be ensured. As the result, the hardness of the inside of the head portion cannot be improved and thus the internal fatigue damage resistance is unlikely to be improved. Therefore, it is preferable that the time of holding the temperature after accelerated cooling is set to be in a range of 100 to 200 sec.

The method of holding the temperature during controlled cooling is not particularly limited. It is preferable to perform cooling that controls recuperation generated from the inside of the rail head portion by repeatedly performing the cooling and stopping of the outer surface of the rail head portion using air injection cooling, mist cooling, mixed injection cooling of water and air, or a refrigerant obtained by combining these. Specifically, it is preferable that accelerated cooling is stopped on a low temperature side in a temperature region where the temperature is held, cooling is started after looking ahead the recuperation generated from the inside of the rail head portion, and cooling is stopped before the temperature reaches the lower limit of a predetermined temperature range. Further, it is preferable that this temperature control is repeatedly performed to control the holding time. In a case where the amount of recuperation is small, it is also effective to perform heating using an IH coil or the like.

In a case of controlling the ratio (CA/NA) of the number of carbon atoms (CA) to the number of nitrogen atoms (NA) of V carbonitride for the purpose of controlling the number of V carbonitride and controlling the difference in hardness between the surface of the head portion and the inside of the head portion, the stop temperature of cooling and the holding temperature thereafter may be set to be in a range of 610° C. to 640° C. during the above-described controlled cooling.

When the accelerated cooling is performed to lower than 610° C., the amount of carbides in V carbonitride is increased, the ratio (CA/NA) of the number of carbon atoms (CA) to the number of nitrogen atoms (NA) of V carbonitride is unlikely to be controlled, and fine cracks occurring in the periphery of the V carbonitride are unlikely to be prevented. Therefore, in a case of controlling the ratio (CA/NA), it is preferable that the temperature during temperature holding after accelerated cooling is set to be in a range of 610° C. to 640° C.

The refrigerant for the heat treatment of the rail head portion is not particularly limited. In order to control the hardness so as to impart the wear resistance and the internal fatigue damage resistance, it is preferable to control the cooling rate of the rail head portion at the time of the heat treatment using air injection cooling, mist cooling, mixed injection cooling of water and air, or a combination of these.

EXAMPLES

Next, examples of the present invention will be described.

Tables 1 to 6 show the chemical compositions and characteristics of rails of the present invention. Tables 1 to 6 show values of chemical compositions, values of Mn/Cr to be calculated from the values of the chemical compositions (mass %), and values of 0.25×Mn+Cr. In the microstructure of the head portion in Tables 3 and 4, the "pearlite" indicates that the area ratio of the pearlite structure is 95% or greater and a small amount of a pro-eutectoid ferrite, a pro-eutectoid cementite, a bainite structure, or a martensite structure may be mixed at an area ratio of 5% or less.

Tables 7 to 9 show the chemical compositions and characteristics of rails for comparison. Tables 7 to 9 show values of chemical compositions, values of Mn/Cr to be calculated from the values of the chemical compositions (mass %), and values of 0.25×Mn+Cr. In the microstructure of the head portion in Table 8, the "pearlite" indicates that the area ratio of the pearlit structure e is 95% or greater and a small amount of a pro-eutectoid ferrite, a pro-eutectoid cementite, a bainite structure, or a martensite structure may be mixed by an area ratio of 5% or less. Meanwhile, when a structure other than the pearlite structure is described, this means that the structure is included at an area ratio of greater than 5%.

The outline of the production process and the production conditions of examples and comparative examples of the present invention, listed in Tables 1 to 6 and Tables 7 to 9, is as follows.

Outline of entire process

Entire process is performed in the following order:
(1) melting steel;
(2) chemical composition adjustment;
(3) casting (bloom or slab);
(4) re-heating (1250° C. to 1300° C.);
(5) hot rolling; and
(6) heat treatment (accelerated cooling or controlled cooling).

Further, the outline of the production conditions of examples and comparative examples of the present invention is as follows.

Conditions for hot rolling

Final hot rolling temperature (outer surface of head portion): 900° C. to 1000° C.

Final reduction (reduction of area): 2% to 20%

Conditions for heat treatment (outer surface of head portion): performing natural air cooling after hot rolling and then performed accelerated cooling and controlled cooling.

Accelerated cooling (outer surface of head portion):

Cooling rate: 2° C./sec to 8° C./sec

Start temperature of accelerated cooling: 750° C. or higher

Stop temperature of accelerated cooling: 580° C. to 640° C.

Controlled cooling (outer surface of head portion):

Holding temperature in temperature range of 580° C. to 640° C. for 100 to 200 sec after stopping accelerated cooling and then performing air cooling In this case, in regard to A20, A22, A24, A26, and the like of Tables 1 to 6, the conditions for accelerated cooling and controlled cooling after hot rolling were set as follows in order to control the ratio (CA/NA) of the number of carbon atoms (CA) to the number of nitrogen atoms (NA) of V carbonitride and prevent fine cracks occurring in the periphery of carbonitrides.

Conditions for heat treatment (outer surface of head portion): performing natural air cooling after hot rolling and then performed accelerated cooling and controlled cooling.

Accelerated cooling (outer surface of head portion):

Cooling rate: 2° C./sec to 8° C./sec

Start temperature of accelerated cooling: 750° C. or higher

Stop temperature of accelerated cooling: 610° C. to 640° C.

Controlled cooling (outer surface of head portion):

Holding temperature in temperature range of 610° C. to 640° C. for 100 to 200 sec after stopping accelerated cooling and then performing air cooling In the above-described manner, steel Nos. A1 to A44 (rails of examples of the present invention) and steel Nos. B1 to B23, B62, and B72 (rails of comparative examples) listed in Tables 1 to 9 were produced.

Rails A1 to A44 of the present invention are rails in which the values of chemical compositions, the values of Mn/Cr and the values of 0.25×Mn+Cr formed of the values of chemical compositions (mass %), the microstructure of the head portion, and the hardness of the head portion are in the ranges of the present application of the invention. Meanwhile, rails B1 to B15, B62, and B72 (17 lines) of comparative examples are rails in which the contents of C, Si, Mn Cr, P, S V, and N and the number of V carbonitride having an average grain size of 5 to 20 nm in the inside of the head portion are out of the ranges of the present application of the invention. Further, rails B16 to B23 of comparative examples are rails in which the values of Mn/Cr or the values of 0.25×Mn+Cr are out of the ranges of the present application of the invention.

Further, rails (C1 to C24) listed in Tables 10 and 11 were produced by changing various conditions for hot rolling and conditions for the heat treatment (conditions for accelerated cooling and conditions for controlled cooling) using a bloom or slab having the same chemical compositions as those of the rail of the present invention.

According to the following method, observation of the microstructure of the head portion, measurement of the number of V carbonitride having a grain size of 5 to 20 nm, the hardness of the head portion, the difference in hardness between the surface of the head portion and the inside of the head portion, and CA/NA, a wear test, and a rolling contact fatigue test were performed on these rails A1 to A44, B1 to B23, and C1 to C24. The results are listed in Tables 1 to 11.

[Observation of Microstructure of Head Portion]

The metallographic structure in the visual field of an optical microscope of 200 magnifications was observed on 10 or more positions at a depth of 2 mm from the outer surface of the head portion as the origin and 10 or more positions at a depth of 25 mm from the outer surface of the head portion as the origin, the area ratio of each metallographic structure was determined, and then the average value of the area ratio was used as the area ratio of the observed portion.

[Number of V Carbonitride Having Grain Size of 5 to 20 nm]

Samples were machined from a position at a depth of 25 mm from the outer surface of the head portion of the transverse cross section as the origin, thin film processing or replica collection was performed, and then observation was performed using a transmission electron microscope at a magnification of 50000 to 500000 times. Further, each of the observed precipitate was analyzed, only the V carbonitride (precipitates at least containing V and carbon, V and nitrogen, or V and carbon and nitrogen) were selected, the area thereof was acquired, and the average grain size was calculated using a diameter of a circle corresponding to the area. Further, the average value was acquired by performing observation of 20 visual fields, counting the number of V carbonitride having a predetermined diameter, and converting the number of V carbonitride to the number per unit area.

[Measurement of CA/NA]

A needle sample was processed (10 μm×10 μm×100 μm) according to focused ion beam (FIB) method from a position at a depth of 25 mm from the outer surface of the head portion as the origin, and the number of carbon atoms and the number of nitrogen atoms contained in V carbonitride were counted according to a three-dimensional atom probe (3DAP) method. From the results, the ratio (CA/NA) of the number of carbon atoms (CA) to the number of nitrogen atoms (NA) was calculated. CA/NA were measured at 5 or more points and the average value was used as the representative value. At this time, the voltage was set to DC and pulse (pulse rate of 20% or greater) and the sample temperature was set to 40 K or lower.

[Measurement of Hardness of Head Portion and Difference in Hardness Between Surface of Head Portion and Inside of Head Portion]

A sample was machined from the transverse cross section of the rail head portion, the transverse cross section was polished with diamond abrasive grains having an average grain size of 1 μm, and measurement was performed on arbitrary 20 sites at a depth of 2 mm from the outer surface of the head portion and arbitrary 20 sites at a depth of 25 mm from the outer surface of the head portion at a load of 98 N using a Vickers hardness tester in conformity with JIS Z 2244. Further, the average value of the hardness of 20 sites in each depth position was set to the hardness of the position.

[Wear Test]

Figure 8:
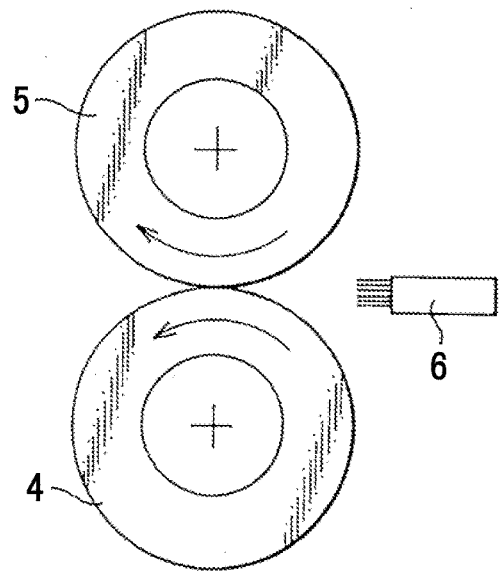
FIG. 8 is a view showing the outline of the wear test.

Tester: Nishihara type wear testing machine (see FIG. 8)

Shape of specimen (rail material 4): disc-shaped test piece (outer diameter: 30 mm, thickness: 8 mm)

Figure 7:
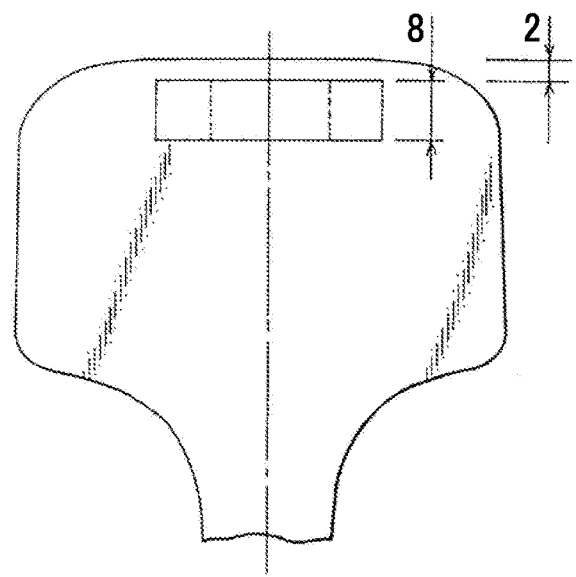
FIG. 7 is a view showing a position of machining wear test specimens.

Position for machining test specimen: position at depth of 2 mm under outer surface of head portion (surface of head portion (see FIG. 7))

Test load: 686 N (contact pressure of 640 MPa)

Slip ratio: 20%

Opposite specimen (wheel material 5): pearlitic steel (Hv 380)

Atmosphere: in air

Cooling: forced cooling using compressed air injection from air nozzle 6 for cooling (flow rate: 100 Nl/min)

Number of repetition: 700000

Acceptance or rejection criteria: As the result of performing the wear test and evaluation of wear resistance at actual tracks, it was confirmed that the wear resistance at actual tracks was poor when the wear amount was greater than 1.30 g. Consequently, rails having a wear amount of greater than 1.30 g were determined to have poor wear resistance.

[Rolling Contact Fatigue Test]

Tester: rolling contact fatigue tester (see FIG. 9)

Shape of Test Piece

Rail 8: 141 lbs rail×2 m

Wheel 9: AAR type (diameter of 920 mm)

Load

Radial: 50 to 300 kN

Thrust: 20 kN

Lubrication: oil (intermittently supplied)

Number of repetition: 2000000 in maximum

Acceptance or rejection criteria: The number of repetition at the time of occurrence of cracks on the outer surface of the rail head portion and cracks in the inside of the head portion was determined as the lifetime of the rail. In a case where occurrence of cracks was not found respectively on the outer surface of the rail head portion and in the inside of the head portion after 2000000 repetitions, it was determined that the damage resistance was excellent. The presence or absence of cracks in the inside of the head portion was confirmed by detecting flaws using ultrasonic testing (UST) during the test. In this case, since fine cracks having a crack length of up to 2 mm do not greatly deteriorate the damage resistance, the presence of fine cracks was accepted.

[Method of Measuring Hardness of Cross Section of Rail Head Portion]

Measuring device: Vickers hardness tester (load of 98 N)

Collection of test pieces for measurement: machined sample out from transverse cross section of rail head portion Pre-processing: polishing sample with diamond abrasive grains having average grain size of 1 μm Measurement method: carried out in conformity with JIS Z 2244

Calculation of hardness:

Depth of 2 mm under outer surface of head portion: Measurement was performed on arbitrary 20 sites (at a depth of 2 mm under the surface) of the surface of the head portion of the rail transverse cross section shown in FIG. 6 and the average value thereof was set to the hardness of the surface of the portion.

Depth of 25 mm under outer surface of head portion: Measurement was performed on arbitrary 20 sites (at a depth of 25 mm under the surface) in the inside of the head portion of the rail transverse cross section shown in FIG. 6 and the average value thereof was set to the hardness of the surface of the portion.

As shown in Tables 1 to 9, in the rails of the examples of the present invention (A1 to A44) compared to the rails of the comparative examples (B1 to B15, B62, and B72), the contents of C, Si, Mn, Cr, P, S, V, and N of steel were in the limited ranges, generation of the pro-eutectoid ferrite, the pro-eutectoid cementite, the bainite structure, and the martensite structure was suppressed, and the head portion was formed of the pearlite structure. Further, in the rails of the present invention, the hardness of the inside of the head portion was set to be lower than the hardness of the surface of the head portion by controlling the number of V carbonitride and the wear resistance and the internal fatigue damage resistance were improved by controlling the difference in hardness between the surface of the head portion and the inside of the head portion and suppressing embrittlement of the pearlite structure and generation of bubbles.

Further, as shown in Tables 1 to 9, in rail steels (A1 to A44) of the examples of the present invention compared to rail steels (B16 to B23) of the comparative examples, generation of the bainite or the martensite was suppressed by controlling the contents of C, Si, Mn, P, and S, the values of Mn/Cr, and the values of 0.25×Mn+Cr and embrittlement of the pearlite structure was suppressed and the wear resistance and the internal fatigue damage resistance were improved by controlling the hardness of the pearlite structure.

Further, as shown in Tables 1 to 6, in examples in which the ratio (CA/NA) of the number of carbon atoms (CA) to the number of nitrogen atoms (NA) of V carbonitride was limited to 0.70 or less among the rails of the examples of the present invention, the wear resistance and the internal fatigue damage resistance were further improved by suppressing an increase in hardness of V carbonitride and suppressing and preventing occurrence of potential cracks.

Further, as shown in Tables 10 and 11, generation of the bainite structure was suppressed so that the pearlite structure was obtained by performing hot rolling and the heat treatment of the head portion under certain conditions. Further, since generation of V carbonitride was able to be promoted, rails having excellent wear resistance and internal fatigue damage resistance were obtained.

TABLE 1

| | Steel No. | Chemical composition (mass %) remainder of Fe and impurities | | | | | | | | | | |
|---|---|---|---|---|---|---|---|---|---|---|---|---|
| | | C | Si | Mn | Cr | P | S | V | N | Mo | Co | B |
| Examples of invention | A1 | 0.75 | 0.25 | 0.80 | 0.30 | 0.0120 | 0.0110 | 0.020 | 0.0050 | — | — | — |
| | A2 | 0.85 | 0.25 | 0.80 | 0.30 | 0.0120 | 0.0110 | 0.020 | 0.0050 | — | — | — |
| | A3 | 0.80 | 0.10 | 0.60 | 0.45 | 0.0180 | 0.0150 | 0.010 | 0.0045 | — | — | — |
| | A4 | 0.80 | 1.00 | 0.60 | 0.45 | 0.0180 | 0.0150 | 0.010 | 0.0045 | — | — | — |
| | A5 | 0.78 | 0.35 | 0.30 | 0.30 | 0.0150 | 0.0080 | 0.030 | 0.0080 | — | — | — |
| | A6 | 0.78 | 0.35 | 1.20 | 0.30 | 0.0150 | 0.0080 | 0.030 | 0.0080 | — | — | — |
| | A7 | 0.83 | 0.55 | 0.80 | 0.20 | 0.0150 | 0.0080 | 0.020 | 0.0120 | — | — | — |
| | A8 | 0.83 | 0.55 | 0.80 | 0.80 | 0.0150 | 0.0080 | 0.020 | 0.0120 | — | — | — |
| | A9 | 0.84 | 0.60 | 0.70 | 0.50 | 0.0250 | 0.0100 | 0.020 | 0.0080 | — | — | — |
| | A10 | 0.84 | 0.60 | 0.80 | 0.45 | 0.0150 | 0.0250 | 0.020 | 0.0080 | — | — | — |
| | A11 | 0.80 | 0.45 | 0.65 | 0.55 | 0.0120 | 0.0100 | 0.010 | 0.0050 | — | — | — |
| | A12 | 0.80 | 0.45 | 0.65 | 0.55 | 0.0120 | 0.0100 | 0.200 | 0.0050 | — | — | — |
| | A13 | 0.76 | 0.40 | 0.80 | 0.25 | 0.0160 | 0.0130 | 0.020 | 0.0040 | — | — | — |
| | A14 | 0.76 | 0.40 | 0.80 | 0.25 | 0.0160 | 0.0130 | 0.020 | 0.0200 | — | — | — |
| | A15 | 0.80 | 0.60 | 0.66 | 0.65 | 0.0120 | 0.0100 | 0.030 | 0.0080 | — | — | — |
| | A16 | 0.80 | 0.60 | 1.00 | 0.25 | 0.0120 | 0.0100 | 0.030 | 0.0080 | — | — | — |
| | A17 | 0.85 | 0.45 | 0.40 | 0.20 | 0.0150 | 0.0080 | 0.080 | 0.0050 | — | — | — |
| | A18 | 0.85 | 0.45 | 1.00 | 0.75 | 0.0150 | 0.0080 | 0.080 | 0.0050 | — | — | — |
| | A19 | 0.76 | 0.30 | 0.41 | 0.20 | 0.0120 | 0.0100 | 0.020 | 0.0100 | — | 0.10 | — |
| | A20 | 0.76 | 0.30 | 0.41 | 0.20 | 0.0120 | 0.0100 | 0.020 | 0.0100 | — | 0.10 | — |
| | A21 | 0.78 | 0.30 | 0.80 | 0.30 | 0.0120 | 0.0100 | 0.020 | 0.0060 | — | — | — |
| | A22 | 0.78 | 0.30 | 0.80 | 0.30 | 0.0120 | 0.0100 | 0.020 | 0.0060 | — | — | — |

| | Steel No. | Chemical composition (mass %) remainder of Fe and impurities | | | | | | | | Mn/Cr | 0.25 × Mn + Cr |
|---|---|---|---|---|---|---|---|---|---|---|---|
| | | Cu | Ni | Nb | Ti | Mg | Ca | REM | Zr | Al | | |
| Examples of invention | A1 | — | — | — | — | — | — | — | — | — | 2.67 | 0.50 |
| | A2 | — | — | — | — | — | — | — | — | — | 2.67 | 0.50 |
| | A3 | — | — | — | — | — | — | — | — | — | 1.33 | 0.60 |
| | A4 | — | — | — | — | — | — | — | — | — | 1.33 | 0.60 |
| | A5 | — | — | — | — | — | — | — | — | — | 1.00 | 0.38 |
| | A6 | — | — | — | — | — | — | — | — | — | 4.00 | 0.60 |
| | A7 | — | — | — | — | — | — | — | — | — | 4.00 | 0.40 |
| | A8 | — | — | — | — | — | — | — | — | — | 1.00 | 1.00 |
| | A9 | — | — | — | — | — | — | — | — | — | 1.40 | 0.68 |
| | A10 | — | — | — | — | — | — | — | — | — | 1.78 | 0.65 |
| | A11 | — | — | — | — | — | — | — | — | — | 1.18 | 0.71 |
| | A12 | — | — | — | — | — | — | — | — | — | 1.18 | 0.71 |
| | A13 | — | — | — | — | — | — | — | — | — | 3.20 | 0.45 |
| | A14 | — | — | — | — | — | — | — | — | — | 3.20 | 0.45 |
| | A15 | — | — | — | — | — | — | — | — | — | 1.02 | 0.82 |
| | A16 | — | — | — | — | — | — | — | — | — | 4.00 | 0.50 |
| | A17 | — | — | — | — | — | — | — | — | — | 2.00 | 0.30 |
| | A18 | — | — | — | — | — | — | — | — | — | 1.33 | 1.00 |
| | A19 | — | — | — | — | — | — | — | — | — | 2.05 | 0.30 |
| | A20 | — | — | — | — | — | — | — | — | — | 2.05 | 0.30 |
| | A21 | — | — | 0.0025 | 0.0030 | — | — | — | — | — | 2.67 | 0.50 |
| | A22 | — | — | 0.0025 | 0.0030 | — | — | — | — | — | 2.67 | 0.50 |

TABLE 2

| | Steel No. | Chemical composition (mass %) remainder of Fe and impurities | | | | | | | | | | | |
|---|---|---|---|---|---|---|---|---|---|---|---|---|---|
| | | C | Si | Mn | Cr | P | S | V | N | Mo | Co | B | Cu |
| Examples of invention | A23 | 0.78 | 0.50 | 0.60 | 0.40 | 0.0150 | 0.0100 | 0.050 | 0.0060 | — | — | — | — |
| | A24 | 0.78 | 0.50 | 0.60 | 0.40 | 0.0120 | 0.0100 | 0.050 | 0.0060 | — | — | — | — |
| | A25 | 0.80 | 0.60 | 0.75 | 0.60 | 0.0150 | 0.0100 | 0.080 | 0.0045 | — | — | 0.0012 | — |
| | A26 | 0.80 | 0.60 | 0.75 | 0.60 | 0.0150 | 0.0100 | 0.080 | 0.0045 | — | — | 0.0012 | — |
| | A27 | 0.80 | 0.30 | 1.00 | 0.35 | 0.0130 | 0.0080 | 0.020 | 0.0120 | — | — | — | 0.20 |
| | A28 | 0.80 | 0.30 | 1.00 | 0.35 | 0.0130 | 0.0080 | 0.020 | 0.0120 | — | — | — | 0.20 |
| | A29 | 0.82 | 0.70 | 0.80 | 0.45 | 0.0120 | 0.0060 | 0.080 | 0.0150 | — | — | — | — |
| | A30 | 0.82 | 0.70 | 0.80 | 0.45 | 0.0120 | 0.0060 | 0.080 | 0.0150 | — | — | — | — |
| | A31 | 0.82 | 0.45 | 0.60 | 0.55 | 0.0060 | 0.0200 | 0.055 | 0.0120 | — | — | — | — |
| | A32 | 0.82 | 0.45 | 0.60 | 0.55 | 0.0060 | 0.0200 | 0.055 | 0.0120 | — | — | — | — |
| | A33 | 0.82 | 0.65 | 0.45 | 0.40 | 0.0080 | 0.0160 | 0.060 | 0.0140 | 0.01 | — | — | — |
| | A34 | 0.82 | 0.65 | 0.45 | 0.40 | 0.0080 | 0.0160 | 0.060 | 0.0140 | 0.01 | — | — | — |
| | A35 | 0.83 | 0.70 | 0.70 | 0.50 | 0.0200 | 0.0120 | 0.100 | 0.0040 | — | — | — | — |
| | A36 | 0.83 | 0.70 | 0.70 | 0.50 | 0.0200 | 0.0120 | 0.100 | 0.0040 | — | — | — | — |
| | A37 | 0.83 | 0.25 | 0.90 | 0.55 | 0.0180 | 0.0120 | 0.035 | 0.0060 | — | — | — | — |

TABLE 2-continued

| | A38 | 0.83 | 0.25 | 0.90 | 0.55 | 0.0180 | 0.0120 | 0.035 | 0.0060 | — | — | — | — |
| | A39 | 0.83 | 0.55 | 0.80 | 0.55 | 0.0150 | 0.0080 | 0.020 | 0.0180 | — | — | 0.0012 | — |
| | A40 | 0.83 | 0.55 | 0.80 | 0.55 | 0.0150 | 0.0080 | 0.020 | 0.0180 | — | — | 0.0012 | — |
| | A41 | 0.84 | 0.40 | 0.70 | 0.65 | 0.0150 | 0.0160 | 0.030 | 0.0080 | — | — | — | — |
| | A42 | 0.84 | 0.40 | 0.70 | 0.65 | 0.0150 | 0.0160 | 0.030 | 0.0080 | — | — | — | — |
| | A43 | 0.85 | 0.55 | 0.80 | 0.50 | 0.0100 | 0.0120 | 0.140 | 0.0045 | — | — | — | — |
| | A44 | 0.85 | 0.55 | 0.80 | 0.50 | 0.0100 | 0.0120 | 0.140 | 0.0045 | — | — | — | — |

| | Steel No. | Chemical composition (mass %) remainder of Fe and impurities | | | | | | | Mn/Cr | 0.25 × Mn + Cr |
|---|---|---|---|---|---|---|---|---|---|---|
| | | Ni | Nb | Ti | Mg | Ca | REM | Zr | Al | | |
| Examples of invention | A23 | — | — | — | — | — | — | — | — | 1.50 | 0.55 |
| | A24 | — | — | — | — | — | — | — | — | 1.50 | 0.55 |
| | A25 | — | — | — | — | — | — | — | — | 1.25 | 0.79 |
| | A26 | — | — | — | — | — | — | — | — | 1.25 | 0.79 |
| | A27 | — | — | — | — | — | — | — | — | 2.86 | 0.60 |
| | A28 | — | — | — | — | — | — | — | — | 2.86 | 0.60 |
| | A29 | 0.10 | — | — | — | — | — | — | — | 1.78 | 0.65 |
| | A30 | 0.10 | — | — | — | — | — | — | — | 1.78 | 0.65 |
| | A31 | — | — | — | — | — | — | — | — | 1.09 | 0.70 |
| | A32 | — | — | — | — | — | — | — | — | 1.09 | 0.70 |
| | A33 | — | — | — | — | — | — | — | — | 1.13 | 0.51 |
| | A34 | — | — | — | — | — | — | — | — | 1.13 | 0.51 |
| | A35 | — | — | — | 0.0025 | 0.0015 | — | — | — | 1.40 | 0.68 |
| | A36 | — | — | — | 0.0025 | 0.0015 | — | — | — | 1.40 | 0.68 |
| | A37 | — | — | — | — | — | 0.0025 | 0.0012 | — | 1.64 | 0.78 |
| | A38 | — | — | — | — | — | 0.0025 | 0.0012 | — | 1.64 | 0.78 |
| | A39 | — | — | — | — | — | — | — | — | 1.45 | 0.75 |
| | A40 | — | — | — | — | — | — | — | — | 1.45 | 0.75 |
| | A41 | — | — | — | — | — | — | — | — | 1.08 | 0.83 |
| | A42 | — | — | — | — | — | — | — | — | 1.08 | 0.83 |
| | A43 | — | — | — | — | — | — | — | 0.0080 | 1.60 | 0.70 |
| | A44 | — | — | — | — | — | — | — | 0.0080 | 1.60 | 0.70 |

TABLE 3

| | Steel No. | Microstructure of head portion | | Number of V carbonitride having grain size of 5 to 20 nm inside of head portion (piece/μm²) | Hardness of head portion (Hv) | | Difference in hardness (2 mm − 25 mm) | Ratio CA/NA of number of carbon atoms (CA) to number of nitrogen atoms (NA) of V carbonitride |
|---|---|---|---|---|---|---|---|---|
| | | 2 mm under outer surface of head portion (surface of head portion) | 25 mm under outer surface of head portion (inside of head portion) | | 2 mm under outer surface of head portion (surface of head portion) | 25 mm under outer surface of head portion (inside of head portion) | | |
| Examples of invention | A1 | Pearlite | Pearlite | 85 | 415 | 378 | 37 | — |
| | A2 | Pearlite | Pearlite | 90 | 428 | 393 | 35 | — |
| | A3 | Pearlite | Pearlite | 52 | 395 | 360 | 35 | — |
| | A4 | Pearlite | Pearlite | 53 | 430 | 400 | 30 | — |
| | A5 | Pearlite | Pearlite | 225 | 390 | 352 | 38 | — |
| | A6 | Pearlite | Pearlite | 230 | 410 | 375 | 35 | — |
| | A7 | Pearlite | Pearlite | 260 | 390 | 355 | 35 | — |
| | A8 | Pearlite | Pearlite | 265 | 480 | 450 | 30 | — |
| | A9 | Pearlite | Pearlite | 180 | 430 | 390 | 40 | — |
| | A10 | Pearlite | Pearlite | 190 | 430 | 395 | 35 | — |
| | A11 | Pearlite | Pearlite | 51 | 449 | 410 | 39 | — |
| | A12 | Pearlite | Pearlite | 495 | 449 | 440 | 9 | — |
| | A13 | Pearlite | Pearlite | 65 | 425 | 390 | 35 | — |
| | A14 | Pearlite | Pearlite | 190 | 425 | 404 | 21 | — |
| | A15 | Pearlite | Pearlite | 215 | 459 | 420 | 39 | — |
| | A16 | Pearlite | Pearlite | 220 | 425 | 395 | 30 | — |
| | A17 | Pearlite | Pearlite | 368 | 380 | 350 | 30 | — |
| | A18 | Pearlite | Pearlite | 370 | 478 | 460 | 18 | — |
| | A19 | Pearlite | Pearlite | 115 | 405 | 370 | 35 | 0.85 |
| | A20 | Pearlite | Pearlite | 120 | 406 | 371 | 35 | 0.40 |
| | A21 | Pearlite | Pearlite | 60 | 424 | 385 | 39 | 1.20 |
| | A22 | Pearlite | Pearlite | 60 | 424 | 385 | 39 | 0.50 |

TABLE 4

| | Steel No. | Microstructure of head portion | | Number of V carbonitride having 25 mm grain size of 5 to 20 nm inside of head portion (piece/μm²) | Hardness of head portion (Hv) | | | Ratio CA/NA of number of carbon atoms (CA) to number of nitrogen atoms (NA) of V carbonitride |
| | | 2 mm under outer surface of head portion (surface of head portion) | 25 mm under outer surface of head portion (inside of head portion) | | 2 mm under outer surface of head portion (surface of head portion) | 25 mm under outer surface of head portion (inside of head portion) | Difference in hardness (2 mm − 25 mm) | |
|---|---|---|---|---|---|---|---|---|
| Examples of invention | A23 | Pearlite | Pearlite | 130 | 431 | 405 | 26 | 1.40 |
| | A24 | Pearlite | Pearlite | 135 | 431 | 404 | 27 | 0.55 |
| | A25 | Pearlite | Pearlite | 180 | 450 | 430 | 20 | 1.60 |
| | A26 | Pearlite | Pearlite | 185 | 450 | 430 | 20 | 0.60 |
| | A27 | Pearlite | Pearlite | 255 | 430 | 412 | 18 | 0.80 |
| | A28 | Pearlite | Pearlite | 260 | 430 | 412 | 18 | 0.30 |
| | A29 | Pearlite | Pearlite | 480 | 449 | 443 | 6 | 0.72 |
| | A30 | Pearlite | Pearlite | 482 | 449 | 443 | 6 | 0.35 |
| | A31 | Pearlite | Pearlite | 395 | 455 | 444 | 11 | 0.80 |
| | A32 | Pearlite | Pearlite | 395 | 455 | 445 | 10 | 0.40 |
| | A33 | Pearlite | Pearlite | 430 | 420 | 412 | 8 | 0.75 |
| | A34 | Pearlite | Pearlite | 432 | 420 | 413 | 7 | 0.35 |
| | A35 | Pearlite | Pearlite | 355 | 445 | 425 | 20 | 2.00 |
| | A36 | Pearlite | Pearlite | 356 | 445 | 425 | 20 | 0.70 |
| | A37 | Pearlite | Pearlite | 278 | 455 | 430 | 25 | 1.40 |
| | A38 | Pearlite | Pearlite | 280 | 455 | 430 | 25 | 0.65 |
| | A39 | Pearlite | Pearlite | 215 | 452 | 420 | 32 | 0.75 |
| | A40 | Pearlite | Pearlite | 220 | 452 | 421 | 31 | 0.35 |
| | A41 | Pearlite | Pearlite | 120 | 475 | 440 | 35 | 0.90 |
| | A42 | Pearlite | Pearlite | 120 | 475 | 440 | 35 | 0.45 |
| | A43 | Pearlite | Pearlite | 415 | 445 | 425 | 20 | 2.50 |
| | A44 | Pearlite | Pearlite | 415 | 445 | 425 | 20 | 0.70 |

TABLE 5

| | Steel No. | Result of wear test Amount of wear (g, 700000 times) | Result of rolling contact fatigue test Presence or absence of fatigue damage (upper limit of 2000000 times) | Special note for production method | Special note for production method | Remark |
|---|---|---|---|---|---|---|
| Examples of invention | A1 | 1.03 | None (2000000 times) | Presence of fine cracks inside | Hot rolling → heat treatment | Lower limit of C |
| | A2 | 1.00 | None (2000000 times) | Presence of fine cracks inside | Hot rolling → heat treatment | Upper limit of C |
| | A3 | 1.04 | None (2000000 times) | Presence of fine cracks inside | Hot rolling → heat treatment | Lower limit of Si |
| | A4 | 1.00 | None (2000000 times) | Presence of fine cracks inside | Hot rolling → heat treatment | Upper limit of Si |
| | A5 | 1.09 | None (2000000 times) | Presence of fine cracks inside | Hot rolling → heat treatment | Lower limit of Mn |
| | A6 | 0.98 | None (2000000 times) | Presence of fine cracks inside | Hot rolling → heat treatment | Upper limit of Mn |
| | A7 | 1.05 | None (2000000 times) | Presence of fine cracks inside | Hot rolling → heat treatment | Lower limit of Mn |
| | A8 | 0.96 | None (2000000 times) | Presence of fine cracks inside | Hot rolling → heat treatment | Upper limit of Mn |
| | A9 | 1.03 | None (2000000 times) | Presence of fine cracks inside | Hot rolling → heat treatment | Upper limit of P |
| | A10 | 1.02 | None (2000000 times) | Presence of fine cracks inside | Hot rolling → heat treatment | Upper limit of S |
| | A11 | 0.94 | None (2000000 times) | Presence of fine cracks inside | Hot rolling → heat treatment | Lower limit of V |
| | A12 | 0.93 | None (2000000 times) | Presence of fine cracks inside | Hot rolling → heat treatment | Upper limit of V |
| | A13 | 1.01 | None (2000000 times) | Presence of fine cracks inside | Hot rolling → heat treatment | Lower limit of N |
| | A14 | 1.01 | None (2000000 times) | Presence of fine cracks inside | Hot rolling → heat treatment | Upper limit of N |
| | A15 | 0.95 | None (2000000 times) | Presence of fine cracks inside | Hot rolling → heat treatment | Lower limit of Mn/Cr |
| | A16 | 1.02 | None (2000000 times) | Presence of fine cracks inside | Hot rolling → heat treatment | Upper limit of Mn/Cr |
| | A17 | 1.04 | None (2000000 times) | Presence of fine cracks inside | Hot rolling → heat treatment | Lower limit of Mn + Cr |
| | A18 | 0.90 | None (2000000 times) | Presence of fine cracks inside | Hot rolling → heat treatment | Upper limit of Mn + Cr |
| | A19 | 1.04 | None (2000000 times) | Presence of fine cracks inside | Hot rolling → heat treatment | Addition of Co |
| | A20 | 1.04 | None (2000000 times) | No cracks | Hot rolling → heat treatment | Addition of Co |
| | A21 | 1.02 | None (2000000 times) | Presence of fine cracks inside | Hot rolling → heat treatment | Addition of Nb and Ti |
| | A22 | 1.02 | None (2000000 times) | No cracks | Hot rolling → heat treatment | Addition of Nb and Ti |

TABLE 6

Result of rolling contact fatigue test

|  | Steel No. | Result of wear test Amount of wear (g, 700000 times) | Presence or absence of fatigue damage (upper limit of 2000000 times) | Special note for production method | Special note for production method | Remark |
|---|---|---|---|---|---|---|
| Examples of invention | A23 | 1.00 | None (2000000 times) Presence of fine cracks inside | Hot rolling → heat treatment | — |
|  | A24 | 1.00 | None (2000000 times) No cracks | Hot rolling → heat treatment | — |
|  | A25 | 0.96 | None (2000000 times) Presence of fine cracks inside | Hot rolling → heat treatment | Addition of B |
|  | A26 | 0.96 | None (2000000 times) No cracks | Hot rolling → heat treatment | Addition of B |
|  | A27 | 0.98 | None (2000000 times) Presence of fine cracks inside | Hot rolling → heat treatment | Addition of Cu |
|  | A28 | 0.98 | None (2000000 times) No cracks | Hot rolling → heat treatment | Addition of Cu |
|  | A29 | 0.96 | None (2000000 times) Presence of fine cracks inside | Hot rolling → heat treatment | Addition of Ni |
|  | A30 | 0.96 | None (2000000 times) No cracks | Hot rolling → heat treatment | Addition of Ni |
|  | A31 | 0.95 | None (2000000 times) Presence of fine cracks inside | Hot rolling → heat treatment | — |
|  | A32 | 0.95 | None (2000000 times) No cracks | Hot rolling → heat treatment | — |
|  | A33 | 0.99 | None (2000000 times) Presence of fine cracks inside | Hot rolling → heat treatment | Addition of Mo |
|  | A34 | 0.99 | None (2000000 times) No cracks | Hot rolling → heat treatment | Addition of Mo |
|  | A35 | 0.95 | None (2000000 times) Presence of fine cracks inside | Hot rolling → heat treatment | Addition of Mg and Ca |
|  | A36 | 0.95 | None (2000000 times) No cracks | Hot rolling → heat treatment | Addition of Mg and Ca |
|  | A37 | 0.94 | None (2000000 times) Presence of fine cracks inside | Hot rolling → heat treatment | Addition of REM and Zr |
|  | A38 | 0.94 | None (2000000 times) No cracks | Hot rolling → heat treatment | Addition of REM and Zr |
|  | A39 | 0.94 | None (2000000 times) Presence of fine cracks inside | Hot rolling → heat treatment | Addition of B |
|  | A40 | 0.93 | None (2000000 times) No cracks | Hot rolling → heat treatment | Addition of B |
|  | A41 | 0.90 | None (2000000 times) Presence of fine cracks inside | Hot rolling → heat treatment | — |
|  | A42 | 0.90 | None (2000000 times) No cracks | Hot rolling → heat treatment | — |
|  | A43 | 0.95 | None (2000000 times) Presence of fine cracks inside | Hot rolling → heat treatment | Addition of Al |
|  | A44 | 0.95 | None (2000000 times) No cracks | Hot rolling → heat treatment | Addition of Al |

TABLE 7

|  | Steel No. | Chemical composition (mass %) remainder of Fe and impurities ||||||||||
|---|---|---|---|---|---|---|---|---|---|---|---|
|  |  | C | Si | Mn | Cr | P | S | V | N | Mo | Co | B |
| Comparative Example | B1 | 0.65 | 0.25 | 0.80 | 0.30 | 0.0120 | 0.0110 | 0.020 | 0.0050 | — | — | — |
|  | B2 | 0.98 | 0.25 | 0.80 | 0.30 | 0.0120 | 0.0110 | 0.020 | 0.0050 | — | — | — |
|  | B3 | 0.80 | 0.05 | 0.60 | 0.45 | 0.0180 | 0.0150 | 0.010 | 0.0045 | — | — | — |
|  | B4 | 0.80 | 2.50 | 0.60 | 0.45 | 0.0180 | 0.0150 | 0.010 | 0.0045 | — | — | — |
|  | B5 | 0.78 | 0.35 | 0.05 | 0.30 | 0.0150 | 0.0080 | 0.030 | 0.0080 | — | — | — |
|  | B6 | 0.78 | 0.35 | 1.60 | 0.30 | 0.0150 | 0.0080 | 0.030 | 0.0080 | — | — | — |
|  | B62 | 0.78 | 0.35 | 1.30 | 0.50 | 0.0150 | 0.0080 | 0.030 | 0.0080 | — | — | — |
|  | B7 | 0.83 | 0.55 | 0.80 | 0.05 | 0.0150 | 0.0080 | 0.020 | 0.0120 | — | — | — |
|  | B72 | 0.83 | 0.55 | 0.50 | 0.19 | 0.0150 | 0.0080 | 0.020 | 0.0120 | — | — | — |
|  | B8 | 0.83 | 0.55 | 0.80 | 1.20 | 0.0150 | 0.0080 | 0.020 | 0.0120 | — | — | — |
|  | B9 | 0.84 | 0.60 | 0.70 | 0.50 | 0.0350 | 0.0100 | 0.020 | 0.0080 | — | — | — |
|  | B10 | 0.84 | 0.60 | 0.80 | 0.45 | 0.0150 | 0.0300 | 0.020 | 0.0080 | — | — | — |
|  | B11 | 0.80 | 0.45 | 0.65 | 0.55 | 0.0120 | 0.0100 | 0.005 | 0.0050 | — | — | — |
|  | B12 | 0.80 | 0.45 | 0.65 | 0.55 | 0.0120 | 0.0100 | 0.250 | 0.0050 | — | — | — |
|  | B13 | 0.85 | 0.55 | 0.80 | 0.50 | 0.0100 | 0.0120 | 0.225 | 0.0045 | — | — | — |
|  | B14 | 0.76 | 0.40 | 0.80 | 0.25 | 0.0160 | 0.0130 | 0.020 | 0.0030 | — | — | — |
|  | B15 | 0.76 | 0.40 | 0.80 | 0.25 | 0.0160 | 0.0130 | 0.020 | 0.0250 | — | — | — |
|  | B16 | 0.80 | 0.60 | 0.66 | 0.80 | 0.0120 | 0.0100 | 0.030 | 0.0080 | — | — | — |
|  | B17 | 0.82 | 0.45 | 0.60 | 0.75 | 0.0060 | 0.0200 | 0.055 | 0.0120 | — | — | — |
|  | B18 | 0.80 | 0.60 | 1.20 | 0.25 | 0.0120 | 0.0100 | 0.030 | 0.0080 | — | — | — |
|  | B19 | 0.82 | 0.70 | 1.00 | 0.20 | 0.0120 | 0.0060 | 0.080 | 0.0150 | — | — | — |
|  | B20 | 0.85 | 0.45 | 0.30 | 0.20 | 0.0150 | 0.0080 | 0.080 | 0.0050 | — | — | — |
|  | B21 | 0.78 | 0.50 | 0.31 | 0.21 | 0.0150 | 0.0100 | 0.050 | 0.0060 | — | — | — |
|  | B22 | 0.85 | 0.45 | 1.20 | 0.80 | 0.0150 | 0.0080 | 0.080 | 0.0050 | — | — | — |
|  | B23 | 0.84 | 0.40 | 1.15 | 0.75 | 0.0150 | 0.0160 | 0.030 | 0.0080 | — | — | — |

|  | Steel No. | Chemical composition (mass %) remainder of Fe and impurities ||||||||| Mn/Cr | 0.25 × Mn + Cr |
|---|---|---|---|---|---|---|---|---|---|---|---|
|  |  | Cu | Ni | Nb | Ti | Mg | Ca | REM | Zr | Al |  |  |
| Comparative Example | B1 | — | — | — | — | — | — | — | — | — | 2.67 | 0.50 |
|  | B2 | — | — | — | — | — | — | — | — | — | 2.67 | 0.50 |
|  | B3 | — | — | — | — | — | — | — | — | — | 1.33 | 0.60 |
|  | B4 | — | — | — | — | — | — | — | — | — | 1.33 | 0.60 |
|  | B5 | — | — | — | — | — | — | — | — | — | 0.17 | 0.31 |
|  | B6 | — | — | — | — | — | — | — | — | — | 5.33 | 0.70 |
|  | B62 | — | — | — | — | — | — | — | — | — | 2.60 | 0.83 |
|  | B7 | — | — | — | — | — | — | — | — | — | 16.00 | 0.25 |
|  | B72 | — | — | — | — | — | — | — | — | — | 2.63 | 0.32 |
|  | B8 | — | — | — | — | — | — | — | — | — | 0.67 | 1.40 |

TABLE 7-continued

| | | | | | | | | | | | | |
|---|---|---|---|---|---|---|---|---|---|---|---|---|
| B9  | — | —    | — | — | — | — | — | — | —      | 1.40 | 0.68 |
| B10 | — | —    | — | — | — | — | — | — | —      | 1.78 | 0.65 |
| B11 | — | —    | — | — | — | — | — | — | —      | 1.18 | 0.71 |
| B12 | — | —    | — | — | — | — | — | — | —      | 1.18 | 0.71 |
| B13 | — | —    | — | — | — | — | — | — | 0.0080 | 1.60 | 0.70 |
| B14 | — | —    | — | — | — | — | — | — | —      | 3.20 | 0.45 |
| B15 | — | —    | — | — | — | — | — | — | —      | 3.20 | 0.45 |
| B16 | — | —    | — | — | — | — | — | — | —      | <u>0.83</u> | 0.97 |
| B17 | — | —    | — | — | — | — | — | — | —      | <u>0.80</u> | 0.90 |
| B18 | — | —    | — | — | — | — | — | — | —      | <u>4.80</u> | 0.55 |
| B19 | — | 0.10 | — | — | — | — | — | — | —      | <u>5.00</u> | 0.45 |
| B20 | — | —    | — | — | — | — | — | — | —      | 1.50 | <u>0.28</u> |
| B21 | — | —    | — | — | — | — | — | — | —      | 1.48 | <u>0.29</u> |
| B22 | — | —    | — | — | — | — | — | — | —      | 1.50 | <u>1.10</u> |
| B23 | — | —    | — | — | — | — | — | — | —      | 1.53 | <u>1.04</u> |

TABLE 8

| | Steel No. | Microstructure of head portion | | | Number of V carbonitride having grain size of 5 to 20 nm inside of head portion (piece/μm²) | Hardness of head portion (Hv) | | | Ratio CA/NA of number of carbon atoms (CA) to number of nitrogen atoms (NA) of V carbonitride |
|---|---|---|---|---|---|---|---|---|---|
| | | 2 mm under outer surface of head portion (surface of head portion) | 25 mm under outer surface of head of head portion (inside of head portion) | Other special notes | | 2 mm under outer surface of head portion (surface of head portion) | 25 mm under outer surface of head portion (inside of head portion) | Difference in hardness (2 mm – 25 mm) | |
| Comparative Example | B1 | Pearlite + proeutectoid ferrite | Pearlite + proeutectoid ferrite | None | 85 | 380 | 360 | 20 | — |
| | B2 | Pearlite | Pearlite + proeutectoid ferrite | None | 90 | 428 | 400 | 28 | — |
| | B3 | Pearlite | Pearlite | None | 52 | 395 | 345 | 50 | — |
| | B4 | Pearlite + martensite | Pearlite | None | 53 | 556 | 400 | 156 | — |
| | B5 | Pearlite + bainite | Pearlite | None | 225 | 385 | 335 | 50 | — |
| | B6 | Pearlite + martensite | Pearlite | None | 230 | 570 | 380 | 190 | — |
| | B62 | Pearlite + martensite | Pearlite | None | 100 | 612 | 400 | 212 | — |
| | B7 | Pearlite + martensite | Pearlite | None | 260 | 582 | 330 | 252 | — |
| | B72 | Pearlite | Pearlite | None | 125 | 340 | 305 | 35 | — |
| | B8 | Pearlite + bainite + martensite | Pearlite | None | 265 | 578 | 450 | 128 | — |
| | B9 | Pearlite | Pearlite | High P → embrittlement of structure inside of head portion | 180 | 430 | 390 | 40 | — |
| | B10 | Pearlite | Pearlite | High S → | 190 | 430 | 395 | 35 | — |

TABLE 8-continued

| Steel No. | Microstructure of head portion | | | Hardness of head portion (Hv) | | | Ratio CA/NA of number of carbon atoms (CA) to number of nitrogen atoms (NA) of V carbonitride |
|---|---|---|---|---|---|---|---|
| | 2 mm under outer surface of head portion (surface of head portion) | 25 mm under outer surface of head (inside of head portion) | Other special notes | Number of V carbonitride having grain size of 5 to 20 mm inside of head portion (piece/μm²) | 2 mm under outer surface of head portion (surface of head portion) | 25 mm under outer surface of head (inside of head portion) | Difference in hardness (2 mm – 25 mm) |
| B11 | Pearlite | Pearlite | coarsening of MnS inside of head portion | <u>25</u> | 449 | 395 | 54 | — |
| B12 | Pearlite | Pearlite | None | <u>600</u> | 449 | 460 | <u>-11</u> | — |
| B13 | Pearlite | Pearlite | None | <u>550</u> | 445 | 450 | <u>-5</u> | — |
| B14 | Pearlite | Pearlite | None | <u>45</u> | 425 | 380 | <u>45</u> | — |
| B15 | Pearlite | Pearlite | High N → generation of bubbles inside of head portion | 190 | 425 | 404 | 21 | — |
| B16 | <u>Pearlite + bainite</u> | Pearlite | None | 215 | 430 | 420 | 10 | — |
| B17 | <u>Pearlite + bainite</u> | Pearlite | None | 395 | 450 | 444 | 6 | — |
| B18 | <u>Pearlite + martensite</u> | Pearlite | None | 220 | <u>570</u> | 400 | <u>170</u> | — |
| B19 | <u>Pearlite + martensite</u> | Pearlite | None | 480 | <u>580</u> | 443 | <u>137</u> | — |
| B20 | Pearlite | Pearlite | None | 368 | 370 | <u>340</u> | 30 | — |
| B21 | Pearlite | Pearlite | None | 130 | 390 | <u>345</u> | <u>45</u> | — |
| B22 | <u>Pearlite</u> | Pearlite | None | 370 | <u>530</u> | 460 | <u>70</u> | — |
| B23 | <u>Pearlite</u> | Pearlite | None | 120 | <u>521</u> | 440 | <u>81</u> | — |

TABLE 9

| | Steel No. | Result of wear test — Amount of wear (g, 700000 times) | Result of rolling contact fatigue test — Presence or absence of fatigue damage (upper limit of 2000000 times) | Special note for production method | Special note for production method | Remark |
|---|---|---|---|---|---|---|
| Comparative Example | B1 | 1.31 (large amount of wear) | Occurrence of internal damage (1250000 times) | Occurrence of internal cracks | Hot rolling → heat treatment | Lower limit of C |
| | B2 | 1.00 | Occurrence of internal damage (1160000 times) | Occurrence of internal cracks | Hot rolling → heat treatment | Upper limit of C |
| | B3 | 1.04 | Occurrence of internal damage (1600000 times) | Occurrence of internal cracks | Hot rolling → heat treatment | Lower limit of Si |
| | B4 | 1.53 (large amount of wear) | Occurrence of surface damage (1250000 times) | Presence of fine internal cracks | Hot rolling → heat treatment | Upper limit of Si |
| | B5 | 1.33 (large amount of wear) | Occurrence of internal damage (1720000 times) | Occurrence of internal cracks | Hot rolling → heat treatment | Lower limit of Mn |
| | B6 | 1.62 (large amount of wear) | Occurrence of surface damage (1400000 times) | Presence of fine internal cracks | Hot rolling → heat treatment | Upper limit of Mn |
| | B62 | 1.82 (large amount of wear) | Occurrence of surface damage (1250000 times) | Presence of fine internal cracks | Hot rolling → heat treatment | Upper limit of Mn |
| | B7 | 1.82 (large amount of wear) | Occurrence of surface and internal damage (1650000 times) | Occurrence of internal cracks | Hot rolling → heat treatment | Lower limit of Cr |
| | B72 | 1.52 (large amount of wear) | Occurrence of surface and internal damage (950000 times) | Occurrence of internal cracks | Hot rolling → heat treatment | Lower limit of Cr |
| | B8 | 1.73 (large amount of wear) | Occurrence of surface damage (1350000 times) | Presence of fine internal cracks | Hot rolling → heat treatment | Upper limit of Cr |
| | B9 | 1.03 | Occurrence of internal damage (1650000 times) | Occurrence of internal cracks | Hot rolling → heat treatment | Upper limit of P |
| | B10 | 1.02 | Occurrence of internal damage (500000 times) | Occurrence of internal cracks | Hot rolling → heat treatment | Upper limit of S |
| | B11 | 0.94 | Occurrence of surface damage (1500000 times) | Occurrence of internal cracks | Hot rolling → heat treatment | Lower limit of V |
| | B12 | 0.93 | Occurrence of surface damage (1300000 times) | Occurrence of surface cracks | Hot rolling → heat treatment | Upper limit of V |
| | B13 | 0.95 | Occurrence of surface damage (1400000 times) | Occurrence of surface cracks | Hot rolling → heat treatment | Addition of Al |
| | B14 | 1.01 | Occurrence of internal damage (1810000 times) | Occurrence of internal cracks | Hot rolling → heat treatment | Lower limit of N |
| | B15 | 1.01 | Occurrence of internal damage (350000 times) | Occurrence of surface cracks | Hot rolling → heat treatment | Upper limit of N |
| | B16 | 2.49 (large amount of wear) | None (2000000 times) | Presence of fine internal cracks | Hot rolling → heat treatment | Lower limit of Mn/Cr |
| | B17 | 2.65 (large amount of wear) | None (2000000 times) | Presence of fine internal cracks | Hot rolling → heat treatment | Lower limit of Mn/Cr |
| | B18 | 1.72 (large amount of wear) | Occurrence of surface damage (1100000 times) | Occurrence of internal cracks | Hot rolling → heat treatment | Upper limit of Mn/Cr |
| | B19 | 1.78 (large amount of wear) | Occurrence of surface damage (1200000 times) | Occurrence of internal cracks | Hot rolling → heat treatment | Addition of Ni |
| | B20 | 1.10 | Occurrence of internal damage (1780000 times) | Occurrence of internal cracks | Hot rolling → heat treatment | Lower limit of Mn + Cr |
| | B21 | 1.07 | Occurrence of internal damage (1950000 times) | Occurrence of internal cracks | Hot rolling → heat treatment | Lower limit of Mn + Cr |
| | B22 | 0.82 | Occurrence of surface damage (1850000 times) | Occurrence of internal cracks | Hot rolling → heat treatment | Upper limit of Mn + Cr |
| | B23 | 0.85 | Occurrence of surface damage (1880000 times) | Occurrence of internal cracks | Hot rolling → heat treatment | Upper limit of Mn + Cr |

TABLE 10

| | | Hot rolling | | Heat treatment | | | | Microstructure of head portion | | Number of V carbonitride having grain size of 5 to 20 nm inside of head portion (piece/μm²) |
| | | | | Conditions for accelerated cooling | | Conditions for controlled cooling | | 2 mm under outer surface of head portion (surface of head portion) | 25 mm under outer surface of head (inside of head portion) | |
| Example | Steel No. | Final rolling temperature (° C.) | Final reduction (%) | Accelerated cooling rate (° C./sec) | Stop temperature (° C.) | Holding temperature range (° C.) | Holding time (sec) | | | |
| --- | --- | --- | --- | --- | --- | --- | --- | --- | --- | --- |
| C1 | A23 | 950 | 15 | 10.0 | 590 | 590-600 | 120 | Pearlite + bainite | Pearlite | 130 |
| C2 | A23 | 950 | 15 | 5.0 | 590 | 590-600 | 120 | Pearlite | Pearlite | 130 |
| C3 | A24 | 950 | 15 | 5.0 | 615 | 615-630 | 120 | Pearlite | Pearlite | 135 |
| C4 | A31 | 930 | 20 | 4.0 | 550 | 585-605 | 180 | Pearlite + bainite | Pearlite | 130 |
| C5 | A31 | 930 | 20 | 4.0 | 585 | 585-605 | 180 | Pearlite | Pearlite | 395 |
| C6 | A32 | 930 | 20 | 4.0 | 620 | 620-640 | 180 | Pearlite | Pearlite | 395 |
| C7 | A41 | 975 | 18 | 1.0 | 580 | 580-605 | 130 | Pearlite | Pearlite | 120 |
| C8 | A41 | 975 | 18 | 3.0 | 580 | 580-605 | 130 | Pearlite | Pearlite | 120 |
| C9 | A42 | 975 | 18 | 3.0 | 610 | 610-630 | 130 | Pearlite | Pearlite | 120 |
| C10 | A19 | 945 | 5 | 7.0 | 670 | 585-608 | 130 | Pearlite | Pearlite | 115 |
| C11 | A19 | 945 | 5 | 7.0 | 585 | 585-608 | 130 | Pearlite | Pearlite | 115 |
| C12 | A20 | 945 | 5 | 7.0 | 585 | 620-640 | 130 | Pearlite | Pearlite | 120 |
| C13 | A27 | 1000 | 8 | 6.0 | 590 | 590-605 | 195 | Pearlite | Pearlite | 255 |
| C14 | A28 | 1000 | 8 | 6.0 | 615 | 615-640 | 195 | Pearlite | Pearlite | 260 |
| C15 | A27 | 1000 | 8 | 6.0 | 590 | 550-570 | 195 | Pearlite | Pearlite | 15 (small number of precipitates) |
| C16 | A29 | 980 | 12 | 5.0 | 580 | 580-605 | 175 | Pearlite | Pearlite | 480 |
| C17 | A30 | 980 | 12 | 5.0 | 610 | 610-630 | 175 | Pearlite | Pearlite | 482 |
| C18 | A29 | 980 | 12 | 5.0 | 580 | 650-660 | 175 | Pearlite | Pearlite | 25 (small number of precipitates) |
| C19 | A33 | 930 | 15 | 4.0 | 580 | 580-600 | 145 | Pearlite | Pearlite | 430 |
| C20 | A34 | 930 | 15 | 4.0 | 615 | 615-640 | 145 | Pearlite | Pearlite | 432 |
| C21 | A33 | 930 | 15 | 4.0 | 580 | 580-600 | 80 | Pearlite | Pearlite | 45 (small number of precipitates) |
| C22 | A43 | 910 | 12 | 3.0 | 590 | 590-605 | 155 | Pearlite | Pearlite | 415 |
| C23 | A44 | 910 | 12 | 3.0 | 620 | 620-640 | 155 | Pearlite | Pearlite | 415 |
| C24 | A43 | 910 | 12 | 3.0 | 590 | 590-605 | 240 | Pearlite | Pearlite | 45 (coarsening of precipitates → decrease in number) |

TABLE 11

| Example | Steel No. | Hardness of head portion (Hv) | | | Ratio CA/NA of number of carbon atoms (CA) to number of nitrogen atoms (NA) of V carbonitride | Result of wear test Amount of wear (g, 700000 times) | Result of rolling contact fatigue test | |
|---|---|---|---|---|---|---|---|---|
| | | 2 mm under outer surface of head portion (surface of head portion) | 25 mm under outer surface of head (inside of head portion) | Difference in hardness (2 mm − 25 mm) | | | Presence or absence of fatigue damage (upper limit of 2000000 times) | Special note |
| C1 | A23 | 410 | 405 | 5 | 1.40 | 1.31 (large amount of wear) | None (2000000 times) | Presence of fine internal cracks |
| C2 | A23 | 431 | 405 | 26 | 1.40 | 1.00 | None (2000000 times) | Presence of fine internal cracks |
| C3 | A24 | 431 | 404 | 27 | 0.55 | 1.00 | None (2000000 times) | No cracks |
| C4 | A31 | 400 | 450 | −50 | 0.80 | 1.35 (large amount of wear) | Occurrence of surface damage (1320000 times) | Occurrence of surface damage |
| C5 | A31 | 455 | 444 | 11 | 0.80 | 0.95 | None (2000000 times) | Presence of fine internal cracks |
| C6 | A32 | 455 | 445 | 10 | 0.40 | 0.95 | None (2000000 times) | No cracks |
| C7 | A41 | 392 | 345 | 52 | 0.90 | 1.09 | Occurrence of internal damage (1750000 times) | Occurrence of internal damage |
| C8 | A41 | 475 | 440 | 35 | 0.90 | 0.90 | None (2000000 times) | Presence of fine internal cracks |
| C9 | A42 | 475 | 440 | 35 | 0.45 | 0.90 | None (2000000 times) | No cracks |
| C10 | A19 | 405 | 340 | 65 | 0.85 | 1.04 | Occurrence of internal damage (1620000 times) | Occurrence of internal damage |
| C11 | A19 | 405 | 370 | 35 | 0.85 | 1.04 | None (2000000 times) | Presence of fine internal cracks |
| C12 | A20 | 406 | 371 | 35 | 0.40 | 1.04 | None (2000000 times) | No cracks |
| C13 | A27 | 430 | 412 | 18 | 0.60 | 0.98 | None (2000000 times) | Presence of fine internal cracks |
| C14 | A28 | 430 | 380 | 50 | 0.30 | 0.98 | Occurrence of internal damage (1700000 times) | Occurrence of internal damage |
| C15 | A27 | 430 | 412 | 18 | 0.60 | 0.98 | None (2000000 times) | No cracks |
| C16 | A29 | 449 | 443 | 6 | 0.72 | 0.96 | None (2000000 times) | Presence of fine internal cracks |
| C17 | A30 | 449 | 443 | 6 | 0.35 | 0.96 | None (2000000 times) | No cracks |
| C18 | A29 | 449 | 400 | 49 | 0.72 | 0.96 | Occurrence of internal damage (1750000 times) | Occurrence of internal damage |
| C19 | A33 | 420 | 412 | 8 | 0.75 | 0.99 | None (2000000 times) | Presence of fine internal cracks |
| C20 | A34 | 420 | 413 | 7 | 0.35 | 0.99 | None (2000000 times) | No cracks |
| C21 | A33 | 420 | 375 | 45 | 0.75 | 0.99 | Occurrence of internal damage (1850000 times) | Occurrence of internal damage |
| C22 | A43 | 445 | 425 | 20 | 2.50 | 0.93 | None (2000000 times) | Presence of fine internal cracks |
| C23 | A44 | 445 | 425 | 20 | 0.70 | 0.93 | None (2000000 times) | No cracks |
| C24 | A43 | 445 | 400 | 45 | 2.50 | 0.93 | Occurrence of internal damage (1850000 times) | Occurrence of internal damage |

INDUSTRIAL APPLICABILITY

According to the rail of the present invention, it is possible to improve the wear resistance and the internal fatigue damage resistance. Further, in a case where such a rail was used in cargo railways, the service life of the rail can be greatly improved.

BRIEF DESCRIPTION OF THE REFERENCE SYMBOLS

1: HEAD TOP PORTION
2: HEAD CORNER PORTION
3: RAIL HEAD PORTION
3a: HEAD SURFACE PORTION (RANGE TO DEPTH OF 25 mm FROM SURFACE OF HEAD CORNER PORTION AND HEAD TOP PORTION AS ORIGIN, HATCHED PORTION)
4: RAIL MATERIAL
5: WHEEL MATERIAL
6: AIR NOZZLE FOR COOLING
7: SLIDER FOR MOVING RAIL
8: RAIL
9: WHEEL
10: MOTOR
11: LOAD CONTROL DEVICE

What is claimed is:

1. A rail comprising, as a chemical composition, in terms of mass %:
C: 0.75% to 0.85%;
Si: 0.10% to 1.00%;
Mn: 0.30% to 1.20%;
Cr: 0.20% to 0.80%;
V: 0.01% to 0.20%;
N: 0.0040% to 0.0200%;
Mo: 0% to 0.50%;
Co: 0% to 1.00%;
B: 0% to 0.0050%;
Cu: 0% to 1.00%;
Ni: 0% to 1.00%;
Nb: 0% to 0.0500%;
Ti: 0% to 0.0500%;
Mg: 0% to 0.0200%;
Ca: 0% to 0.0200%;
REM: 0% to 0.0500%;
Zr: 0% to 0.0200%;
Al: 0% to 1.00%;
P≤0.0250%;
S≤0.0250%; and
Fe and impurities as a remainder,
wherein the chemical composition of the rail satisfies the following Expressions 1 and 2,
a structure of a range between an outer surface of a head portion as an origin and a depth of 25 mm includes 95% or greater of a pearlite structure and a hardness of the structure is Hv 350 to 480,
50 to 500 V carbonitride having an average grain size of 5 to 20 nm are present per 1.0 μm² of an area to be inspected in a transverse cross section at a position having the depth of 25 mm from the outer surface of the head portion, and
the value obtained by subtracting a hardness of the position having the depth of 25 mm from the outer surface of the head portion from a hardness of a position having a depth of 2 mm from the outer surface of the head portion is Hv 0 to Hv 40, and
wherein when a number of carbon atoms is defined as CA and a number of nitrogen atoms is defined as NA in the V carbonitride, a ratio CA/NA which is a ratio of CA to NA is 0.70 or less, $$1.00 < Mn/Cr \leq 4.00 \qquad \text{Expression 1,}$$

$$0.30 \leq 0.25 \times Mn + Cr \leq 1.00 \qquad \text{Expression 2,}$$

here, the symbols of elements described in the Expressions 1 and 2 indicate the content of each element in terms of mass %.

2. The rail according to claim 1, comprising, in terms of mass %, at least one selected from the group consisting of:
Mo: 0.01% to 0.50%;
Co: 0.01% to 1.00%;
B: 0.0001% to 0.0050%;
Cu: 0.01% to 1.00%;
Ni: 0.01% to 1.00%;
Nb: 0.0010% to 0.0500%;
Ti: 0.0030% to 0.0500%;
Mg: 0.0005% to 0.0200%;
Ca: 0.0005% to 0.0200%;
REM: 0.0005% to 0.0500%;
Zr: 0.0001% to 0.0200%; and
Al: 0.0100% to 1.00%.

* * * * *